United States Patent [19]
Robertson et al.

[11] Patent Number: 5,319,352
[45] Date of Patent: Jun. 7, 1994

[54] SPEED MONITORING OF IN-PLANT, OPERATOR CONTROLLED VEHICLES

[75] Inventors: John A. Robertson, Chillicothe; Joseph F. Muscarella, Columbus, both of Ohio

[73] Assignee: Telesis Controls Corporation, Chillicothe, Ohio

[21] Appl. No.: 621,658

[22] Filed: Nov. 30, 1990

[51] Int. Cl.$^5$ ............................................. B60Q 1/54
[52] U.S. Cl. .................................. 340/466; 340/670; 181/171
[58] Field of Search .................. 340/466, 441, 425.5, 340/539, 670; 181/171

[56] References Cited

U.S. PATENT DOCUMENTS

| | | | |
|---|---|---|---|
| 2,825,048 | 2/1958 | Jaynes | 340/264 |
| 3,160,869 | 12/1964 | Rambo | 340/263 |
| 3,203,501 | 8/1965 | Carter | 180/82.1 |
| 3,748,641 | 7/1973 | Hartung | 340/53 |
| 3,859,629 | 1/1975 | Komiyama | 340/62 |
| 3,878,915 | 4/1975 | Purland | 180/105 |
| 3,879,705 | 4/1975 | Binder | 340/53 |
| 3,919,688 | 11/1975 | Schick | 340/62 |
| 3,919,689 | 11/1975 | Despain | 340/466 |
| 4,031,527 | 6/1977 | Yanagishima | 340/279 |
| 4,101,870 | 7/1978 | Ekman | 340/53 |
| 4,115,757 | 9/1978 | Blahunka | 340/539 |
| 4,124,840 | 11/1978 | Kobayashi | 340/501 |
| 4,136,331 | 1/1979 | Cullen | 340/53 |
| 4,229,727 | 10/1980 | Gilhooley | 340/441 |
| 4,265,337 | 5/1981 | Dammeyer | 187/9 |
| 4,348,663 | 9/1982 | Yanagishima | 340/576 |
| 4,556,861 | 12/1985 | Hyodo et al. | 340/441 |
| 4,598,797 | 7/1986 | Schultz | 187/9 |
| 4,631,515 | 12/1986 | Blee et al. | 340/441 |
| 4,746,912 | 5/1988 | Clifford et al. | 340/539 |
| 4,800,377 | 1/1989 | Slade | 340/466 |
| 4,849,735 | 7/1989 | Kirtley et al. | 340/539 |

*Primary Examiner*—Jeffrey Hofsass
*Attorney, Agent, or Firm*—Mueller and Smith

[57] ABSTRACT

The speed of in-plant vehicles such as forklift trucks and the like is monitored to provide for the lighting of a warning light where a first speed threshold is reached, the sounding of a horn when a second speed is reached, and for the disabling of the vehicle on the sustaining of the higher speed for a predetermined interval of time. This speed monitoring approach generates a signal having an intermittent monitor output corresponding with the speed of the vehicle and which exhibits a period of lessening duration in corresponding with increasing speeds. Timing of the occurrence of these signals is employed with an accumulator based logic to establish vehicle speed. To avoid apparatus reaction to noise based signals, a select number of occurrences of apparent speed excursions are required before the horn or lamp are activated. Remote supervisory resetting of the monitoring system following the occurrence of a latched warning output is provided through an IR based code transmitting and receiving arrangement.

25 Claims, 17 Drawing Sheets

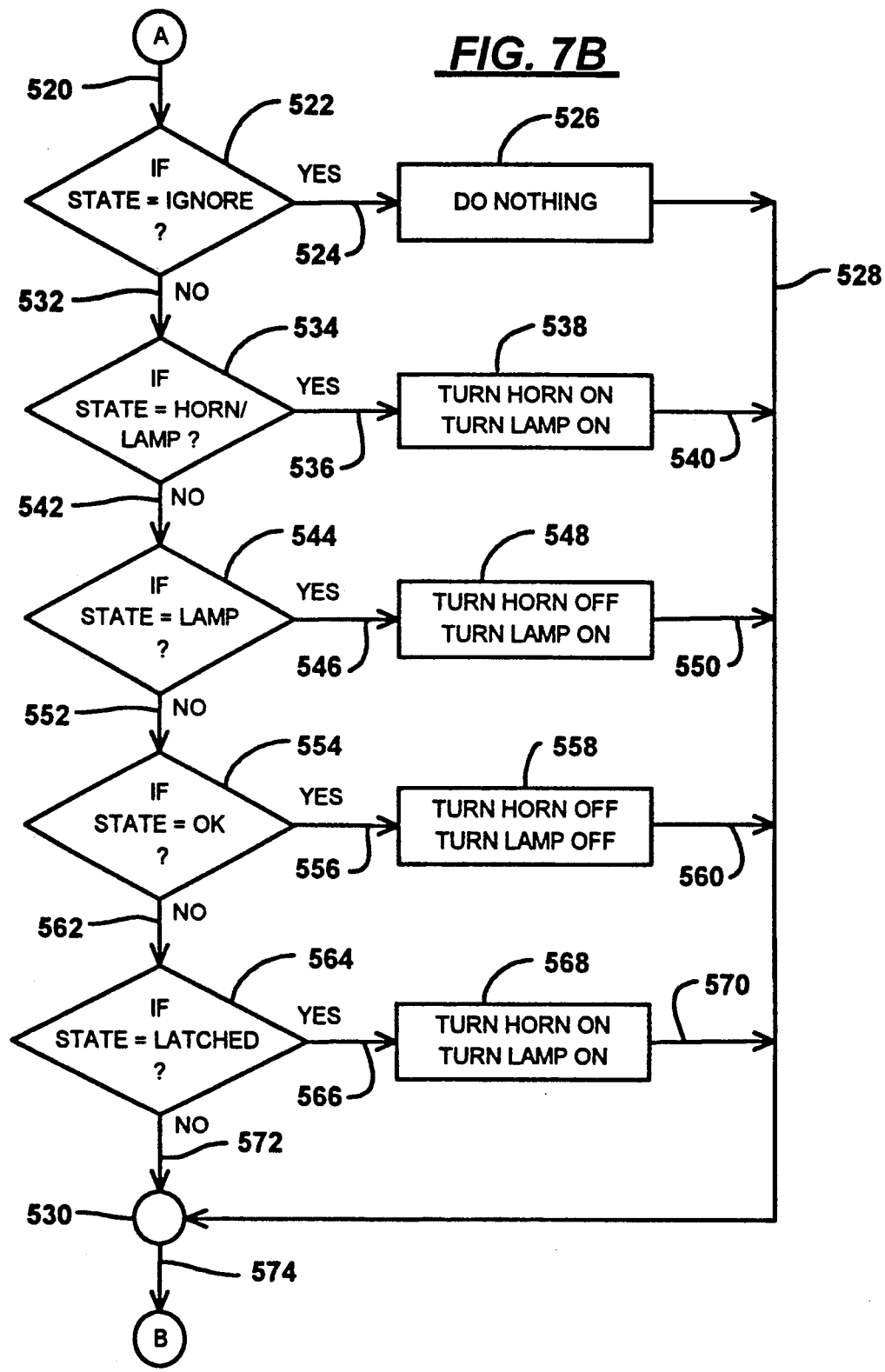

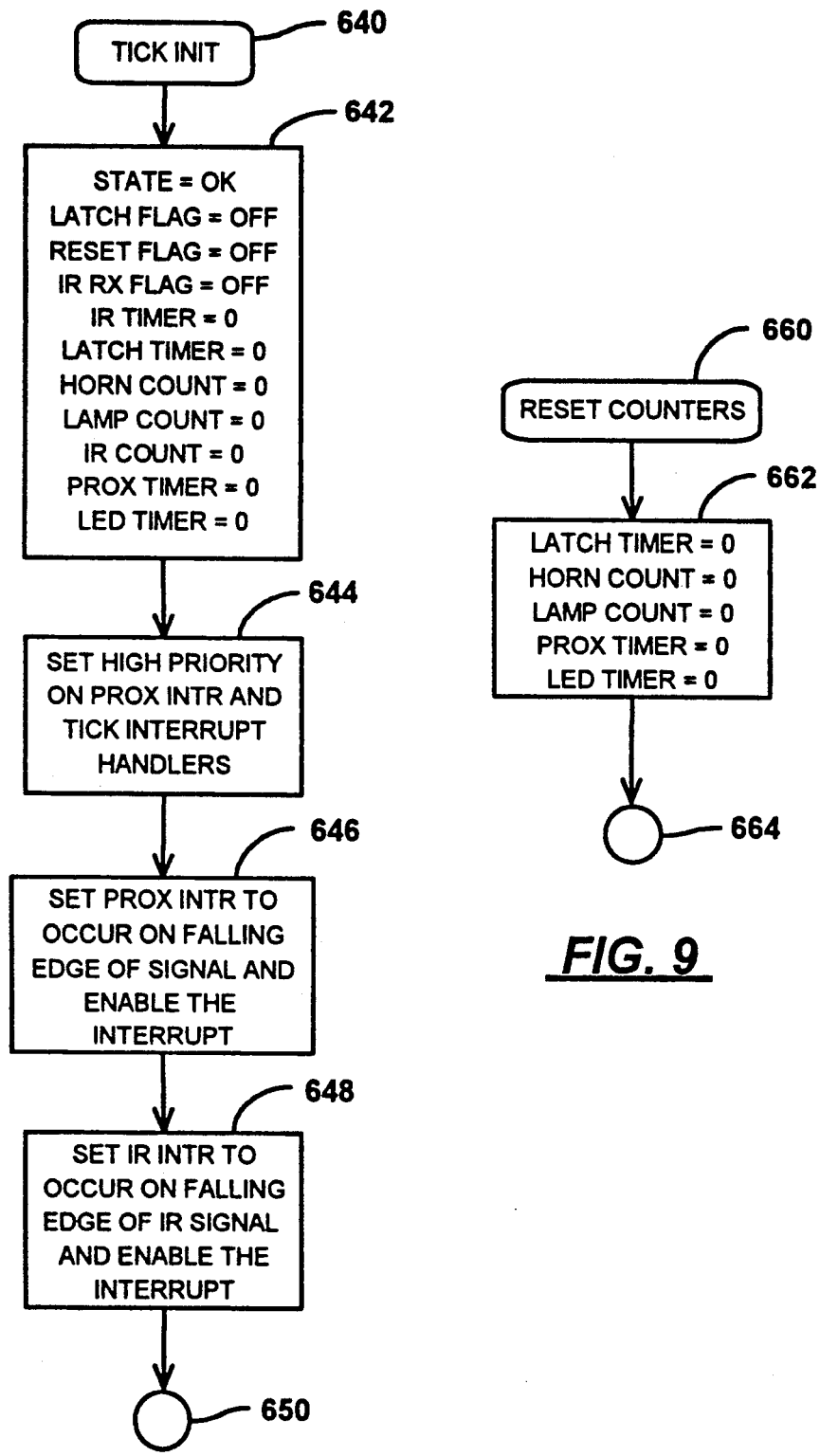

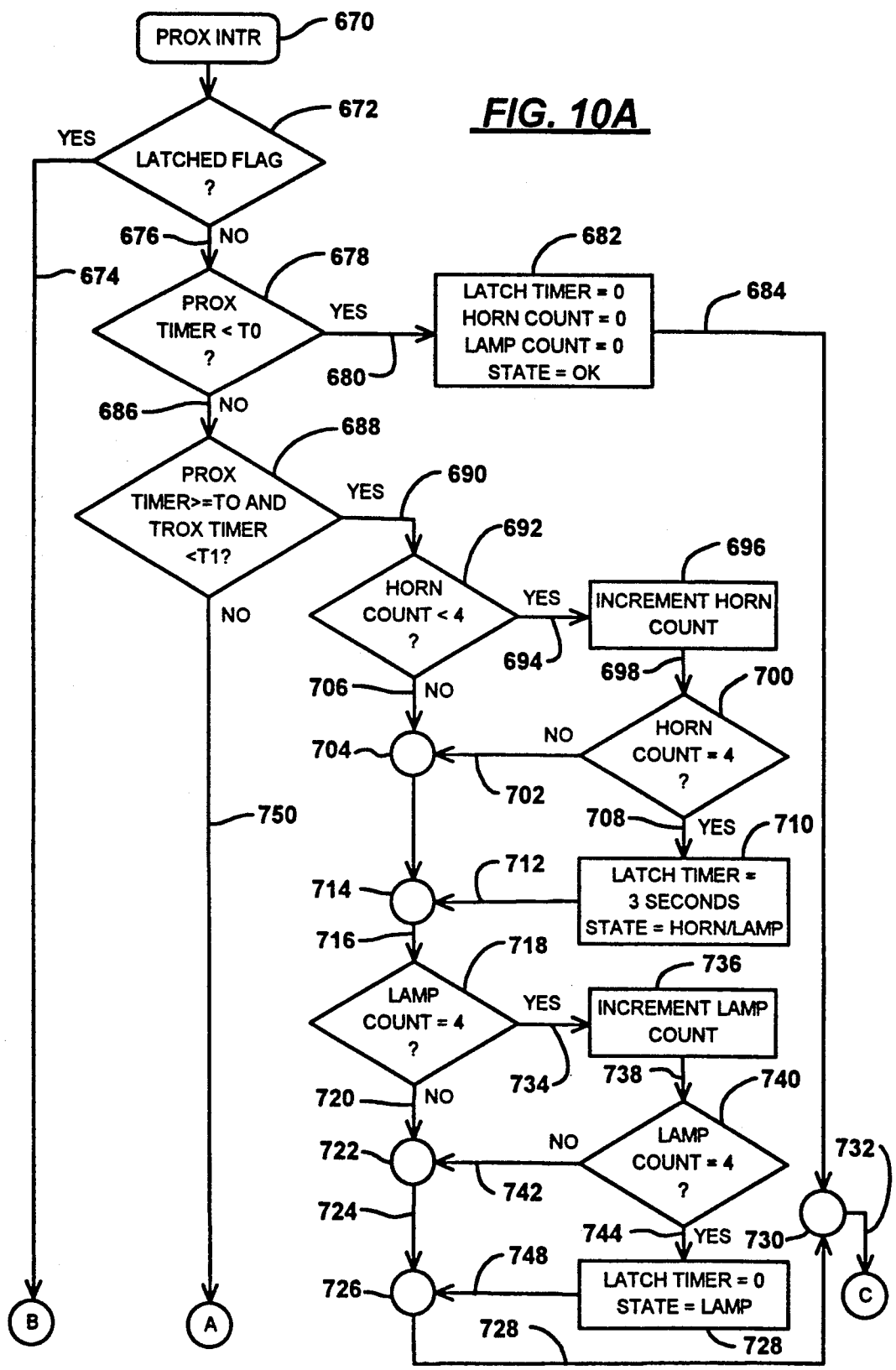

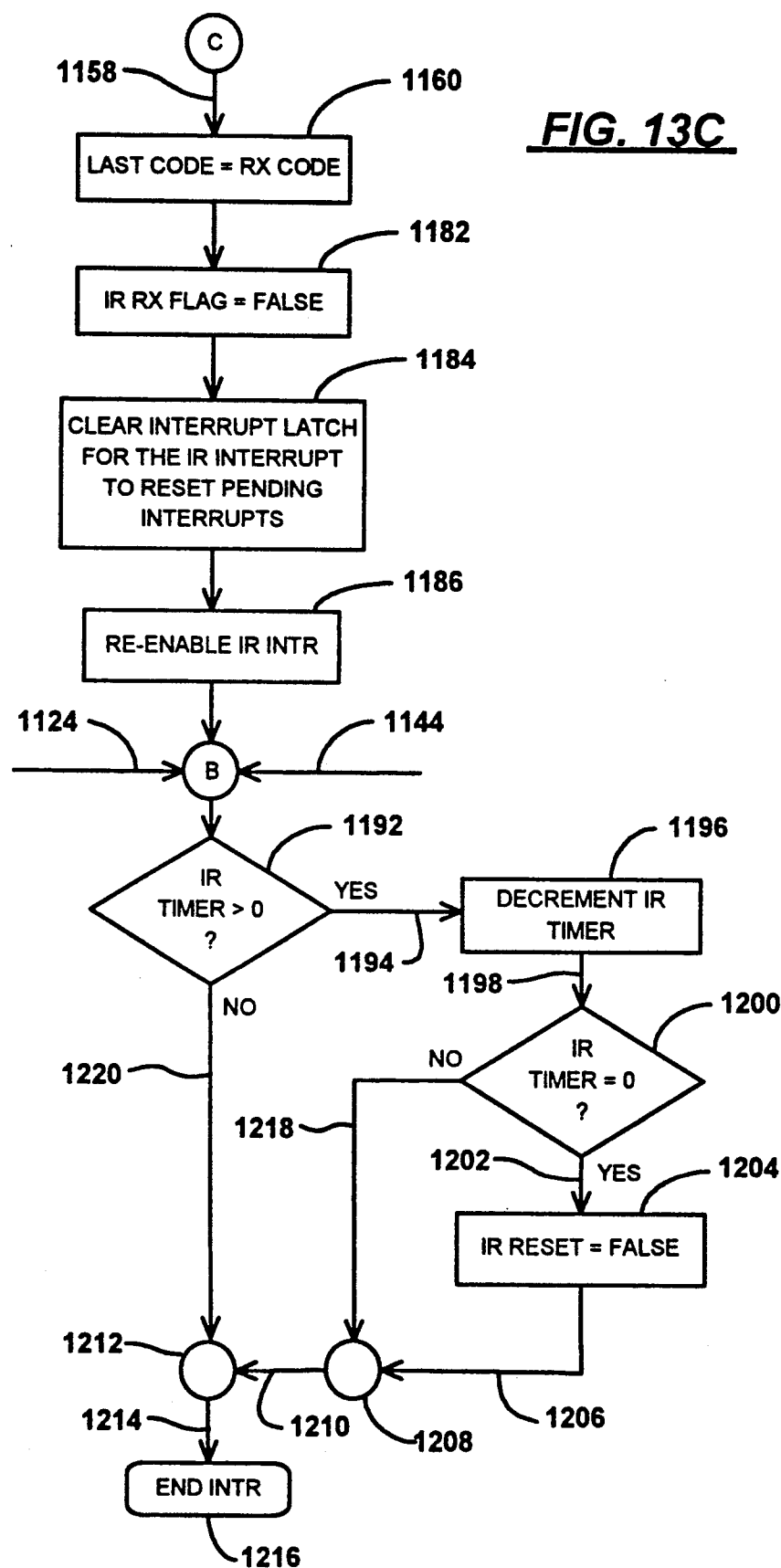

SPEED MONITORING OF IN-PLANT, OPERATOR CONTROLLED VEHICLES

BACKGROUND OF THE INVENTION

The movement of goods, materials and workpieces and people within and about factory and warehousing environments typically is carried out by relatively small, dedicated transport vehicles such as forklift trucks and the like. Operators of these in-plant vehicles have been observed to exhibit an incentive based tendency to operate them at low but still somewhat excessive speeds. Within the environment of a factory or similar workplace, such operation is hazardous, incidents of collisions between the vehicles and plant personnel now reaching numbers resulting in a call for corrective action. Speed governors have been considered but rejected, not only because of the complexity and cost of retrofitting existing vehicles with such systems, but also in view of a needed flexibility of speed capability for the vehicles wherein such speeds are made available to the operators for very short intervals or for operation in non-hazardous regions such as those out of plant, for lifting loads and the like. As a consequence of this need for flexibility in operation, it has been proposed that a cuing form of warning be employed with the vehicles to advise the operator that thresholds of acceptable speeds have been reached and further providing warnings to the operator in the presence of hazardous speed. For example, as the vehicle reaches a speed of 5 miles per hour, a light may be energized to alert the operator that the maximum desired in-plant speed has been reached. A next higher threshold of 7.5 miles per hour would represent a hazardous condition warranting a warning provided as an audible alarm such as developed by an energized horn. Should the hazardous speed condition continue for a set interval, for example 3 seconds or the like, then such response as a vehicle shut-down or other action may be called for requiring some form of supervisory notification or intervention.

Because a typical industrial facility will have several makes and varieties of such inplant vehicles, for example having different lifting features, propane or electrically powered motor systems and the like, the cuing systems or devices incorporating such desired features necessarily must exhibit the attributes of universal adaptability and be capable of relatively simple installation procedures. For instance, the systems may gain speed information by monitoring the rotation of the wheel. While a flag or the like attached to a wheel rim readily may be monitored to provide a pulse categorized indication of wheel revolutions, such simple pick-off techniques also may lead to logic error inasmuch as the duty cycle or operating time of the devices involves a substantial amount of stopping and reversing. Thus, the pulse output of such monitoring may contain a substantial amount of false information.

However, while providing a simplicity of retrofit installation, the desired cuing system should provide for possible sabotage on the part of operators. Such sabotage becomes more available as the design for retrofitting the vehicle becomes more simple. An energized horn, while providing a warning to plant personnel that a vehicle within ear shot is speeding, also may be a source of mental irritation to an involved operator posing a temptation to dismantle the device. Thus, supervisory functions should have available some continuum of diagnostic information that the vehicle mounted devices are in proper working order.

SUMMARY

The present invention is addressed to an operation monitoring apparatus and method for employment with in-plant vehicles such as forklift trucks and the like. Structured so as to be readily retrofitted to each such vehicle, the apparatus provides requisite speed cuing using a horn and light, discernable both to the vehicle operator and to supervisory personnel. Additionally, the apparatus provides a diagnostic cuing output in the form of a vehicle mounted light such as a light emitting diode which respond, for example, in a flashing state under normal operation of the vehicle, but assumes a steady state output where the speed monitoring components of the apparatus have produced no output for a predetermined interval, for example 15 minutes. To accommodate the apparatus to the vagaries of vehicle operation, i.e. reverse-forward and frequent start-stop activity, a select number of occurrences of excessive speed signals or outputs must be experienced as a condition precedent to the actuation of a warning device such as a horn and/or light. Because of the generally electrically "noisy" environment within which such in-plant vehicles are called upon to operate, the monitoring apparatus also accounts for speed signals representing unrealistic rates of vehicle speed. Additionally in this regard, the apparatus logically recognizes that a vehicle speed calling for a first warning, as with the energization of a light, will occur before the occurrence of a higher speed calling for the sounding of a horn or the like. Thus, a window of available actuation of the horn or like device is opened only upon a succession of speed incursions into the region or mode or mode calling, for example, for warning lamp illumination.

The apparatus assumes a "latched" state upon the occurrence of a speed, for example, at the higher level calling for horn actuation, occurring for a predetermined interval of time. To reset or initialize the apparatus following such occurrence, supervisory personnel are called upon to carry out such procedure. To facilitate carrying out of this procedure, the apparatus also includes a feature permitting its response to coded wireless reset communication from remote supervisory locations. This communication, may be effected, for example, by utilization of a convenient hand-held infrared (IR) transmitter which performs in conjunction with a corresponding IR receiver within the vehicle mounted apparatus.

Another feature of the invention is to provide operation monitoring apparatus for an in-plant, operator controlled vehicle having a motor drive and movably supported upon wheels of given diameter. The apparatus includes a wheel movement monitoring arrangement for deriving a wheel rotation output in correspondence with the speed of the vehicle, this output being present as a sequence of intermittent pulse signals. An accumulator arrangement having a resettable accumulator value increasing at a rate from an initial to a final value is provided is actuable to reset to the initial value. A comparison arrangement is responsive to the accumulator value and is actuable to have an output transitioning from a stand-by state to an alarm state in the presence of the accumulator value of level less than a predetermined value representing a select vehicle speed. An input arrangement is responsive to the wheel rotation output for deriving signals actuating the comparison arrangement in response to each pulses signal and the accumulator arrangement. A cuing arrangement is provided having a perceptible output in response to the comparison arrangement output when in the alarm state.

Another feature of the invention provides operation monitoring apparatus for an in-plant, operator controlled vehicle having an electrical source, a motor drive, and movably supported upon rotatable wheels of given diameter. The apparatus includes a speed monitoring arrangement coupled with the vehicle for deriving speed signals each corresponding with a predetermined extent of rotation of at least one of the wheels. A speed evaluation arrangement is responsive to the speed signal and has an output transitioning from a standby state to an alarm state in the presence of speed signals representing a speed of the vehicle exceeding a predetermined value. A speed cuing arrangement having a perceptible output in response to the speed evaluation arrangement output is provided when the alarm state is present. A diagnostic arrangement is responsive to the speed signals for providing a first output in the presence of the occurrence of the speed signals within a predetermined interval of time for providing a second output signal in the absence of the occurrence of the speed signals within the predetermined interval and a preceptable arrangement is responsive to the first and second output signals for providing a first visually perceptible output representing an acceptable operational condition in response to the first output signal and for providing a non-acceptable operational condition mode second visually perceptible output in response to the second output signal representing a non-acceptable operational condition.

Another feature of the invention provides a method for monitoring the speed of an in-plant, operator controlled vehicle having a motor drive and movably supported upon wheels of given diameter, comprising the steps of:

providing a speed monitor having a monitor output present as intermittent pulse signals corresponding with the speed of the vehicle;
determining a first speed threshold value;
determining a second speed threshold as a selected valuation of the first speed threshold value;
accumulating comparison values at a predetermined count rate from an initial value
returning the accumulated comparison values to the initial value in response to each monitor output pulse signal; and
producing a first alarm visually perceptible to the operator when the accumulated comparison values reach an equivalency a predetermined first speed threshold value.

Another feature of the invention provides an operation monitoring for an in-plant, operator controlled vehicle having a motor drive and movably supported upon wheels of given diameter. The apparatus includes a speed monitor having an intermittent monitor output present as pulse signals corresponding with the speed of the vehicle, exhibiting an interval of time between successive pulse signal period of lessening duration in correspondence with increasing speeds of the vehicle. A first cuing arrangement is actuable to provide a first perceptible output. A timing signal arrangement is present for providing a sequence of timing signals of predetermined interval to count from an initial reset value. A timer-counter arrangement is responsive to successive monitor output pulse signals to derive a vehicle speed value in correspondence with a count of the timing signals and resettable to the initial reset value in response to each one of the monitor pulse signals. An input arrangement provides a first speed limit value, T1, and a control arrangement is provided which is responsive to the vehicle speed value and the first speed limit value for deriving a first monitor state and for actuating the first cuing arrangement when the vehicle speed value is less than the value, T1.

The invention, accordingly, comprises the apparatus and method possessing the construction, combination of elements, steps, and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIGS. 7A, 7B, and 7C are a flow chart representing a SCAN routine employed with the control system of the invention;

FIG. 8 is a flow chart showing a TICK INIT routine employed with the control system of the invention;

FIG. 9 is a flow chart showing a RESET COUNTERS routine employed with the control system of the invention;

FIGS. 10A and 10B are a flow chart illustrating a PROX INTR routine employed with the control system of the invention;

FIG. 13A-13C are a flow chart illustrating a TIMER INTR routine employed with the control system of the invention.

DETAILED DESCRIPTION OF THE INVENTION

In the discourse to follow, the operation monitoring apparatus and method of the invention are described initially in conjunction with a partially analog based circuit developed in initial prototyping of the concept. Subsequently, the discourse turns to a preferred embodiment particularly suited for production at normally anticipated volume levels.

Figure 1:
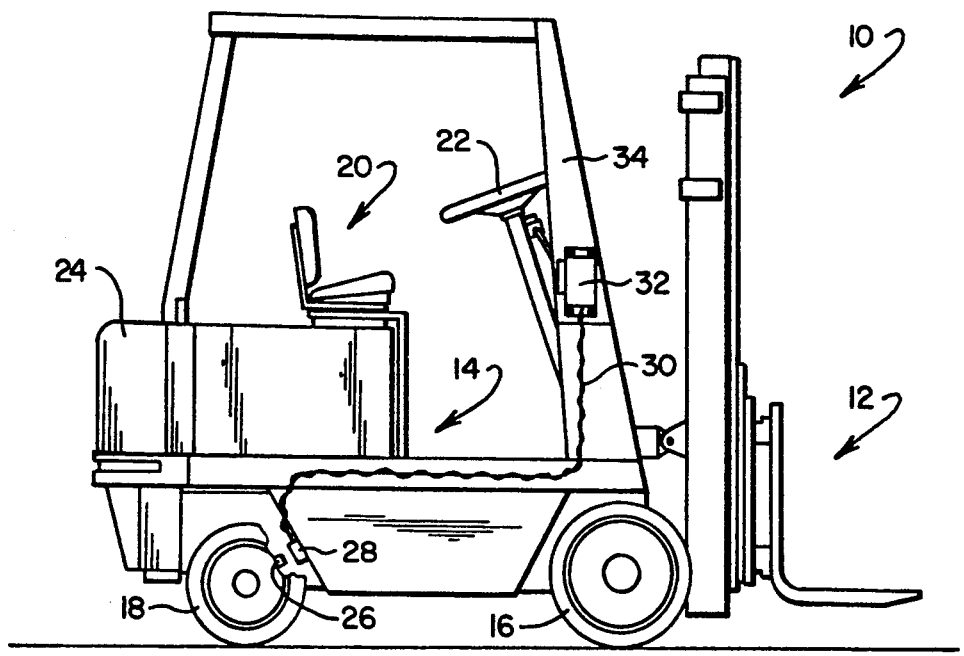
FIG. 1 is a side elevational view of an in-plant vehicle retrofitted to carry the apparatus of the invention and with parts borken away to reveal internal structure.

Looking to FIG. 1, an in-plant vehicle is represented in general at 10 as a forklift truck. Such vehicles as at 10 may take any of a variety of forms and may be structured for any number of functions from the materials movement of a forklift truck to personnel carrying carts. Vehicle 10 incorporates a front forklift represented generally at 12 which is supported from a body frame 14 which, in turn, is supported upon a pair of motor driven wheels, one of which is shown at 16 and non-driven steering wheels, one of which is represented at 18. Guidance through wheels 18 is provided by an operator seated upon a seat 20 who manipulates appropriate control implements including a steering wheel as shown at 22. Seat 20 is positioned in general over a motor containing compartment 24. Drive to vehicles as at 10 may take a variety of forms, but generally will be propane or gasoline driven, or alternately, electric drive is provided from a storage battery source. Typically, the latter storage battery driven devices operate at nominal voltage levels of 36 volts, while the former gas-fueled devices operate with 12 volt supplies as are provided from a battery. Individual structuring for vehicles as at 10 varies with the manufacturer. Usually, a given industrial facility will have vehicles procured from a variety of manufacturers. Thus, operation monitoring systems which are suitable for retrofitting to existing in-plant vehicles must accommodate for variations in design and for operational attributes as the noted variations in electrical power supplies. A universality of retrofitting the monitoring systems is highly desirable along with a compactness facilitating their installation.

A more complex aspect of retrofitting a system upon a vehicle as at 10 resides in developing an indication of the vehicle's instantaneous speed. This is advantageously achieved with an approach of the invention wherein a flag or tag, or the like is welded to a rim of one wheel. Such a flag is represented in the cut-away version on freely rotatable wheel 18 at 26. Mounted to a truss (not shown) with the steered axle supporting wheel 18 is a magnetic proximity detector represented schematically at 28. Cabling 30 is shown extending to the proximity detector 28 and also will extend to the battery associated with vehicle 10. In the latter regard, as noted above, that battery may provide a nominal 12 volt output or 36 volts depending on mode of powering of the vehicle.

Mounting of the flag 26 and associated proximity detector 28 also can be carried out in conjunction with driven wheels as at 18 which are non-steering. However, such wheels may be observed from time to time to skid and thus may give false indications of speed where the determination of that operating parameter is one based on wheel movement. Cabling 30 is seen to extend to a small housing 32 bolted to an upright component 34 of vehicle 10. Housing 32 incorporates control circuitry as well as perceptible cuing components. Accordingly, the device 32 is mounted at a location on vehicle 10 readily perceptible to the operator while sitting upon seat 20. Additionally, the location of the housing 32 is such as to lend its observation to plant supervisory personnel.

Figure 2:
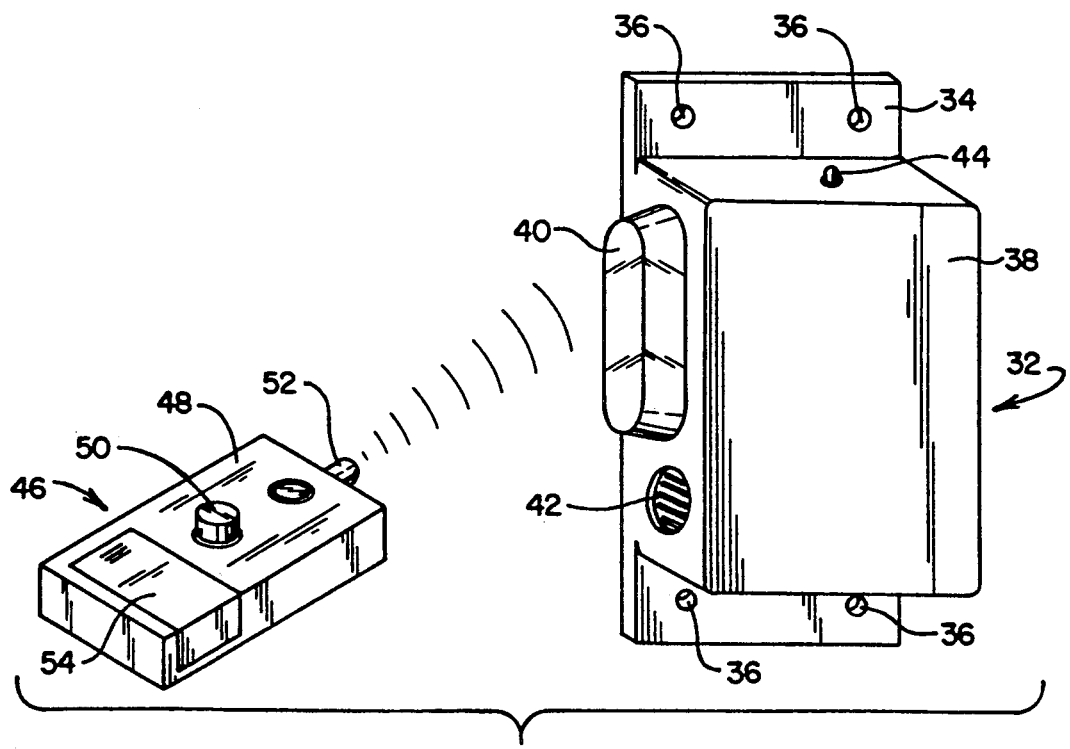
FIG. 2 is a perspective representation of a hand-held reset transmitter and an associated vehicle mounted housing carrying control circuitry according to the invention.

Looking additionally to FIG. 2, the housing 32 is represented at a higher scale. Device 32 may be seen to contain a base 34 carrying mounting holes 36 for providing attachment to an appropriate component of vehicle 10 such as upright 34. Extending from base 34 is a box-like body portion 38 retaining circuitry and also supporting an elongate lens 40 within which a warning light is contained as well as an infrared (IR) detector. Below lens 40 is an annular opening 42, behind which a cuing device such as a horn or like noise making device may be mounted. Upon the upwardly disposed surface of body 38 is a small light emitting diode (LED) 44 which provides a diagnostic form of cuing for plant management. The LED 44 provides a regularly flashing output under normal operation or an acceptable operational condition mode of the monitoring apparatus and, for conditions, for example represented by the disabling of speed monitoring components such as the flag 26 and proximity device 28 will provide a steady state output for alerting management as to a malfunction, or non-acceptable operational condition mode. In effect, device 44 provides three forms of information management. As it flashes, an indication is provided that the monitoring apparatus is powered and functioning. Its steady-state output indicates that an input from the wheel monitoring function has not been received within a predetermined time interval, for example 15 minutes, indicating that this function may be disabled. Finally, disconnection of the monitoring apparatus from its battery power supply is indicated by failure of illumination of device 44. The resetting of the operation monitoring apparatus can be carried out either by a key input (not shown) from management or, through a remote IR communicator as represented by the hand-held communicating device 46. Device 46 is seen to have a box-like housing 48 from which extends an actuating button 50 as well as an IR region light emitting diode within lens 52. The low level electrical supply for device 46 may be provided by batteries within a compartment such as that shown at 54. In general, the device 46 will broadcast a code to be detected by the IR detector within lens 40 of the monitoring apparatus at body component 38 of housing 32.

Figure 3:
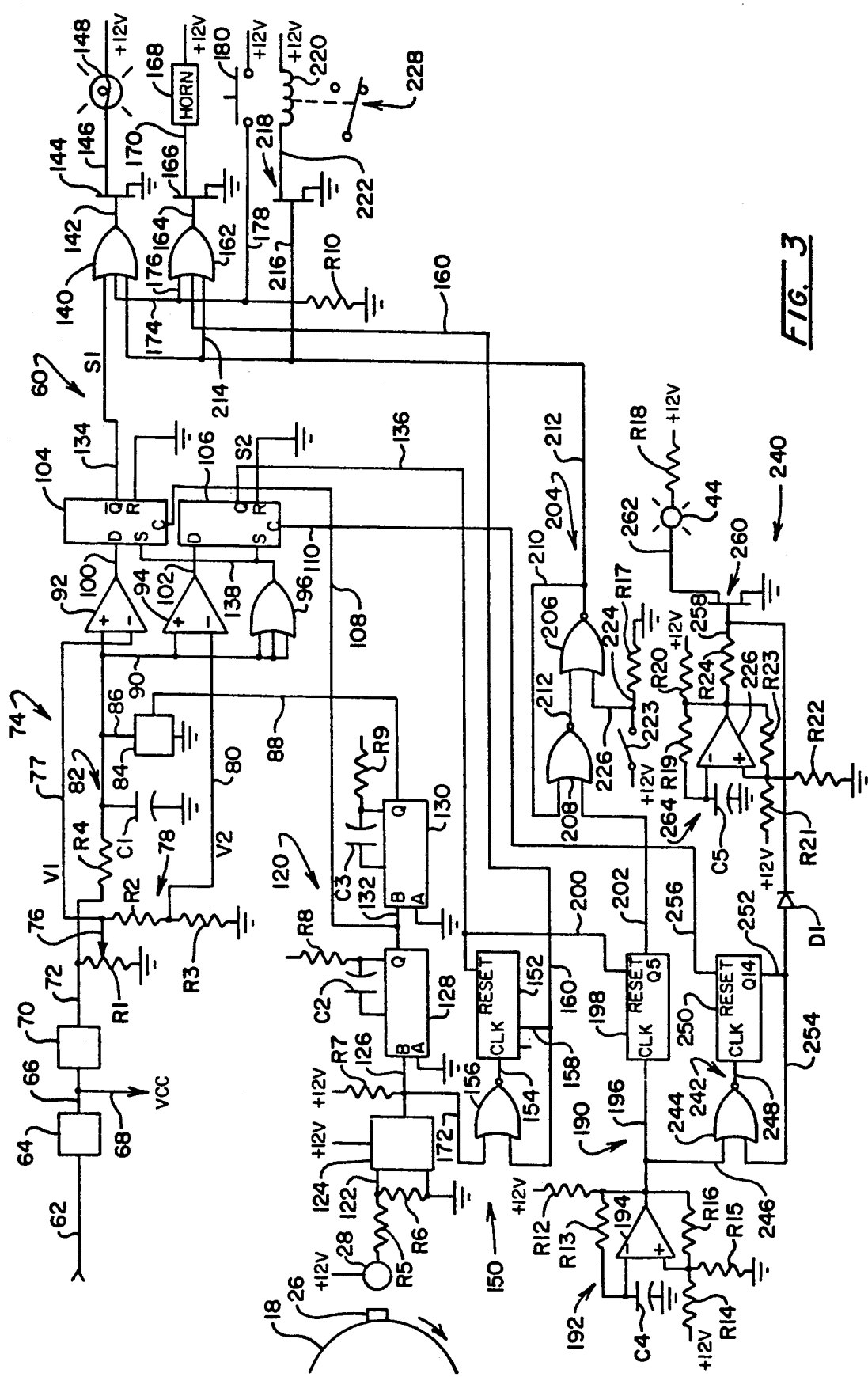
FIG. 3 is an electrical schematic diagram of a prototype control circuit of the invention.

Turning to FIG. 3, an initial embodiment for a circuit carrying out the operation monitoring function is represented generally at 60. The control circuit 60 is connected with the battery power supply of vehicle 10 and, as such it is uninterrupted. However, an accommodation is made as to whether a conventional 12 volt connection to the vehicle battery or a 36 volt connection is made. Where the latter, 36 volt battery power supply is provided, then connection is made via line 62 with that input. Thus, a power supply greater than 12 volts as witnessed with electrically powered vehicles at 36 volts is presented along line 62 to a pre-regulator represented at block 64. Device 64 may be provided as a switching regulator, for example of type LM1578A marketed by National Semi-Conductor Corp. The device provides a 12 volt output at line 66 which, inter alia, develops a 12 volt Vcc supply for the logic circuitry as represented at arrow 68. Where a 12 volt vehicle supply is at hand, then that 12 volt connection will be made with line 66. Line 66 is seen, in turn, to be directed to the input of a fixed voltage regulator or reference regulator represented at block 70. Device 70 provides a regulated 8 volt d.c. reference at line 72 and device 70 may be provided, for example, as a type LM7808 three terminal positive voltage regulator marketed by National Semi-Conductor Corp. Line 72, carrying a regulated 8 volts is introduced to an accumulator network represented generally at 74. Included within the network 74 is a threshold forming or establishing network represented generally at 78 which is seen to include a variable resistor R1, the wiper arm 76 of which extends to line 77 and oppositely to divider resistors R2 and R3. Wiper arm 76 is adjusted to provide a threshold voltage or value which will be seen to correspond with a first and lower speed limitation, designated S1. The value of voltage V1 will be seen to be adjusted with respect to the calibration of the system for vehicle speed. It will, for example, vary with respect to the effective travel extent for each encounting of the flag 26 which, in turn, varies with wheel diameter. The adjusted voltage value, V1, is further divided by resistors R2 and R3 which serve to develop a voltage V2 at line 80 which will be some fixed percentage of or valuation corresponding with the voltage V1. For example, where resistors R2 and R3 are in a 1:2 resistance ratio, the value for voltage V2 will be 66% of the value for voltage V1. The value of voltage V2 may be considered in conjunction with a higher speed threshold designated, S2. Voltage V2 will be seen to represent a threshold value for determining the latter speed.

Line 72, is seen directed to an integrating network 82 comprised of resistor R4 and integrator capacitor C1. Network 82 typically will be structured having a time constant, for example, of about one second. Capacitor C1 of the network 82 is capable of being fully discharged to ground by the action of an analog switch 84 which is coupled to line 76 through line 86. Provided, for example, as a type 4016, the switch component 84 carries out switching action in response to a signal provided thereto along line 88 which is generated in correspondence with the output of proximity detector 28. Thus, as greater speeds are encountered, the rate of switching signals presented from line 88 increases to limit the level of charge achieved at integrating capacitor C1. In effect, the peak voltage levels witnessed at integrating capacitor C1 become inversely related to the speed of vehicle 10. This integration level voltage or accumulator value is directed via line 90 in conjunction with branch lines extending therefrom to the positive terminal of comparators 92 and 94, as well as to the inputs of a three input OR gate 96. The opposite input to comparator 92 is submitted from along line 77 which is seen to carry the voltage value V1 representing the threshold for the lower speed of monitoring. Similarly, line 80 extending from voltage divider network 78 is seen extending to the corresponding terminal of comparator 94. Comparators 92 and 94 may be provided, for example, as type LP339 marketed by National Semi-Conductor Corp. Gate 96 may be provided, for example, as a type 4075. Thus configured, the output of comparator 92 at line 100 assumes a high logic state when the integerator stage 82 voltage exceeds the voltage V1 at line 98. Correspondingly, the output of the comparator stage 94 at line 102 assumes a high logic level when the integrator stage 82 voltage at line 90 exceeds the threshold voltage level V2 at line 80.

The output of comparator 92 at line 100 is coupled to the D input of a latch 104, while the corresponding output of comparator 94 at line 102 is coupled to the D input of a latch 106. Latches 104 and 106 may be provided, for example, as D flip-flops, marketed by Motorola Incorporated as type MC14013B. Such signals or data are latched into the devices 104 and 106 by the rising edge of a latch clock signal at fines 108 and 110.

The signals at line 108 are developed from a speed input network represented generally at 120. Network 120 responds to the "once around" motion of the wheel 18 of the vehicle 10. That wheel 18 is represented schematically with the same numeration in conjunction with the flag or tag 26 thereon. Proximity detector 28 is represented symbolically by the circle at 28. This device may be provided, for example, as a 921 Series Proximity Sensor marketed by the microswitch division of Honeywell, Inc. Typically, such devices will include a light emitting diode (not shown) which will illuminate in conjunction with the passage of, for example, flag 26 in appropriate proximate relationship thereto. This provides a diagnostic (installation) evaluation of the proximity device. The output of device 28 extends via line 122 to one input of an opto-isolator as represented at block 124. Resistors R5 and R6 at the input to device 124 are employed to set the current threshold thereto and provide for the driving of a light emitting diode within the isolator. The isolator 124 may be provided, for example, a type H11L1 including a Schmitt trigger action comparator and serves to respond to current rather than voltage from the detector 28 in view of the unusually highly noisy environment within which vehicles 10 are called upon to operate. For example, strobe lights and the like often are associated with their operation as well as ignition, hydraulic pump switching and the like. The intermittent monitor output of opto-isolator 124 as represented at line 126 is a low going pulse for each passage of the flag 26 before the detector 28. Line 126 is seen coupled to +12 v through pull-up resistor R7 and is directed to the B input of the first of a sequential pair of monostable multivibrators 128 and 130. Devices 128 and 130 may be provided, for example, as type MC14528B monostable multivibrators. These retriggerable, resettable devices may be configured to be triggered from either edge of an input pulse, the duration of which is determined by external timing components as at capacitor C2 and resistor R8 in conjunction with device 128 and capacitor C3 and resistor R9 in conjunction with device 130. The Q output of device 128 at line 132 is coupled to earlier-described line 108 and functions to clock the data or values present at lines 100 and 102 to the D input of respective latches 104 and 106. Following the latching of the accumulator network 74 information, the next monostable multivibrator 130 provides a reset to the integrator network 82 via its Q output at line 88. Accordingly, the pulse interval developed with respect to capacitors C3 and R9 for device 130 is selected as of sufficient duration, e.g. 1 msec, to enable analog switch 84 for an interval of sufficient duration to completely discharge integrating capacitor C1.

Returning to latches 104 and 106, under proper vehicle 10 operational conditions, where speeds S1 and S2 are not exceeded, the normal or reset condition of the output of latch 104 at its $\overline{Q}$ output at line 134 is at a logic low. Correspondingly, the Q output of latch 106 at line 134 will exhibit a logic high output. A signal for of resetting latches 104 and 106 is developed from OR gate 96, the output of which is seen to be coupled with the S terminals thereof through line 138 and connections therefrom. Inasmuch as the three inputs to gate 96 are coupled to line 90, this form of resetting occurs whenever the voltage at line 90 exceeds one-half of the Vcc (12 v) supply to gate 96. Thus, if the integrating capacitor C1 voltage reaches a value of about 6 volts the two latches 104 and 106 are set thereby driving the noted logic low output at line 136 and logic high output at line 136. The reset feature provided by gate 96 permits the system to initialize itself in the absence of external signals.

Line 134 representing the $\overline{Q}$ of latch 104 and corresponding with a speed S1, will revert to a logic high output upon the threshold level at comparator 92 not being reached. This logic high output is presented to one input of a three input OR gate 140, the output of which is directed via line 142 to the base of an FET transistor 144. The source and drain terminals of device 144 respectively, are coupled to line 146 and ground. Line 146, in turn, is coupled to one input of a lamp 148, the opposite input thereof being coupled to +12 v supply. Thus, the lamp 148, which is located behind lens 40 (FIG. 2) of the device is illuminated upon the threshold value V1 not being reached at line 90. Under conditions where the speed of the vehicle 10 increases beyond the initial warning speed, S1, the voltage level at line 90 will continue to diminish until such time as the threshold established for voltage V2 at line 80 is met and comparator 94 will alter its output at line 102 to a low logic level which, in turn, is reflected as a low at output line 136 of latch 106.

So long as the second, higher speed limitation, S2 is not exceeded, then the output of latch 106 at line 136 remains at a logic high level. This logic high level is seen to be asserted to an overtide network represented generally at 150 and including a decade counter 152. Counter 152 may be provided, for example, as a type MC14017B marketed by Motorola, Inc.

Line 136 is coupled to the reset input of counter 152 which, in turn, receives a clock input from line 154 representing the output of a NOR gate 156. The "three" output of counter 152 is tapped by line 158 which, in turn, is coupled via line 160 both to one input of NOR gate 156 and to one input of an OR gate 162. The output of gate 162 at line 164 is connected to the base of an FET power transistor 166, the drain and source terminals of which are coupled to a horn 168 within line 170 and ground. The opposite side of horn 168 is seen coupled to +12 v supply. Thus, horn 168 is energized at such time as a high logic level signal is presented from line 160. However, override network 150 functions to assert a logic delay before the horn 168 can be energized. Returning to that network, note that the opposite input to gate 156 at line 172 receives a clocking pulse to, in turn, clock the counter 152.

Because a lift truck or the like often is employed in a forward-reverse short movement mode, a condition may obtain wherein a flag 26 is adjacent proximity detector 28 during, for example, the loading of a truck or the like. Thus, for such instances, false energizations of horn 168 may be encountered which would represent an unneeded aggravation. Accordingly, three passages of the flag 26 before the proximity detector 28 are required under conditions representing a speed in excess of the higher threshold speed, S2, as represented at line 136 by the removal of the high logic value thereof which otherwise would have reset counter 152. Upon the occasion of the third clock input from gate 156, a logic high value occurs at line 160 which, in view of connection thereof to the input of gate 156, latches counter 152 at that value and turns the horn 168 on to remain on until some resetting feature occurs. Of course, an override network as at 150 may be employed in conjunction with the light 148 itself, however, its momentary light during truck loading procedures or the like may be considered an insufficient inconvenience to merit application of the override features. Other approaches to accommodating for short, reverse and forward maneuvering of vehicles as at 10 are available. For example, more than one flag 26 may be employed with multiple detection, for example employing a quadrature phasing of the outputs of those detectors. However, a complexity of retrofit installation may result from such an approach.

A test feature also is provided for testing the operation of light 148 and horn 168. In this regard, note that a test input to each of the OR gates 140 and 162 is provided, respectively, from lines 174 and 176. Line 176 is seen connected to ground through resistor R10 and is coupled via line 178 to a momentary test switch 180 which, in turn, extends to +12 v supply. Thus, by the momentary closure of switch 180, the operability of light 148 and horn 168 may be tested. Test switch 180 may be a singular switch combined with switch 223.

Now considering the lock on or latch-up mode or condition of operation for the control arrangement 60, it may be recalled that after a predetermined interval of time wherein vehicle 10 exceeds the upper speed limit, S2, some form of locking on of the perceptible outputs may be called for. This interval of excessive speed may be limited, for example, to about 1.7 seconds or the like. The determination as to whether to enter into a latch-up mode is made by an alarm timing network represented generally at 190. Network 190 includes a low frequency oscillator, oscillating at approximately 9 H represented generally at 192 and including a comparator 194 configured as an oscillator with resistors R12-R15 and capacitor C4. Comparator 194 may be provided, for example, as an earlier-described type L339. The output of the device at line 196 is directed to the clock input of a binary counter 198 which is continually reset from line 200 coupled, in turn, to line 136 extending to latch 106 and functioning also to carry out the earlier-described resetting of counter 152. Counter 198 may be provided, for example, as a type MC14024B marketed by Motorola, Inc. and is shown having an output at the Q5 terminal thereof at line 202. Thus configured, counter 198 counts the pulses from network 192 at such time as no reset input is asserted thereto from line 200. Accordingly, a reset condition wherein no counting occurs is present when the speed of vehicle 10 is less than the predetermined higher threshold speed, S2. When the speed of vehicle 10 exceeds speed S2, however, counter 198 commences to count, e.g. at approximately 9 counts per second, and upon reaching a count of "16" produces a logic high value at its Q output at line 202. Thus, 16/9 seconds after vehicle 10's speed exceeds the higher threshold, S2, a lock-on latch network represented generally at 204 is activated. Latch 204 is configured as a cross-coupled latch having two NOR gates 206 and 208, the output of gate 206 being coupled to the input of gate 208 via line 210 and the output of gate 208 being coupled to one input of gate 206 via line 212. With the arrangement shown, the output of latch 204 at line 212 will retain a logic high until the latch 204 is reset. Line 212 is seen directed to one input of gate 140 as well as through line 214 to one input of OR gate 162. Additionally, line 212 extends via line 216 to power FET 218, the drain and source terminals of which, respectively, are coupled to relay coil 220 within line 222 and ground. Coil 220 may be employed with a relay utilized to disable vehicle 10. Contacts as represented at 228 may be provided in conjunction with the relay incorporating coil 220 to provide a form C contact pair, thereby providing for both a normally open and a normally closed contact condition. Latch 204 may be reset by the closure of switch 223 which is coupled within line 22 between +12 v supply and ground and, additionally, via line 226 to gate 206. Switch 223 may be key activated by management personnel or, alternately, may be substituted with remote handheld resetting devices as described at 46 in FIG. 2.

Finally, the control arrangement 60 includes a diagnostic network represented generally at 240. Network 240 performs in conjunction with LED 44 earlier described as being mounted upon vehicle 10 at a location perceivable by supervisory personnel. When appropriately powered, the LED 44 is either illuminated in a steady state or is flashing at about once per second. A flashing mode of operation indicates that a signal has been generated from proximity detector 28 within a given previous period of time, for example within a last 15 minute interval. In the event that the proximity device 28 may have been damaged or tampered with, then a steady state illumination at LED 44 occurs. Diagnostic network 240 includes a diagnostic timing network represented generally at 242 which includes a NOR gate 244, one input to which is coupled via line 246 to receive the timing output of timing network 192. The output of gate 244 is coupled via line 248 to the clock input of a 14 stage binary counter 250. Counter 250 may be provided, for example, as a type 4020 and counts the relatively low frequency input to gate 244 from network 192 until the counter reaches, for example, 8192 counts. This requires about a 15 minute interval and results in a logic high output at line 252 which is directed to line 254. Counter 250 carries out this counting function as long as the input to its reset terminal from line 256 is at a logic low value. The signal from line 256 is derived from a point intermediate the monostable multivibrators 128 and 130, i.e. at line 132. Thus, with the occasion of a signal derived by proximity detector 28, counter 250 is reset. Line 254 is seen to be directed through a diode D1 to line 258 which, in turn, is directed to the base of FET 260. The source and drain terminals of FET 260 are coupled, respectively, to light emitting diode 44 within line 262 and ground. Diode 144, as before, is seen coupled to +12 v through resistor R18. Thus, if the count at terminal Q14 is reached by counter 250, representing completion of about a 15 minute interval without the occurrence of a proximity device 28 generated pulse, then FET 260 is turned on to, in turn, turn on LED 44 in a steady state manner. Also coupled with line 258 leading to the base of FET 260 is an on condition oscillator represented generally at 264 and comprised of comparator 266 performing in conjunction with resistors R19-R23, and capacitor C5. The latter components are arranged and selected to provide about a 1 Hz output at line 258 through gate resistor R24. Thus, at such time as proximity derived pulses have been received on a normal basis within the last 15 minutes, FET 260 is turned on at about a 1 Hz rate to, in turn, cause a corresponding flashing of LED 44.

Figure 4A:
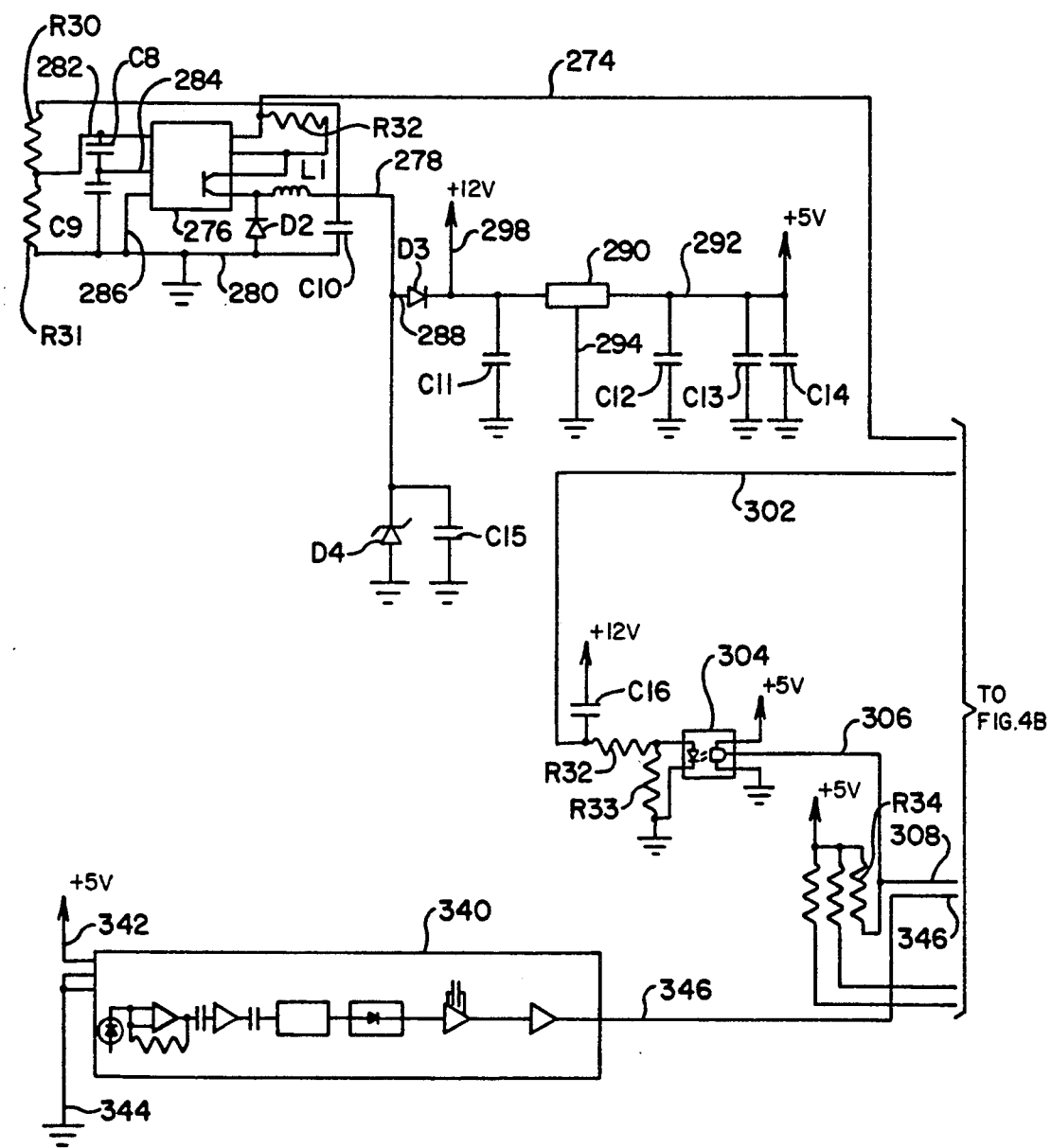
FIGS. 4A and 4B represent an electrical schematic diagram of a control arrangement according to the invention which is microcontroller based.
Figure 4B:
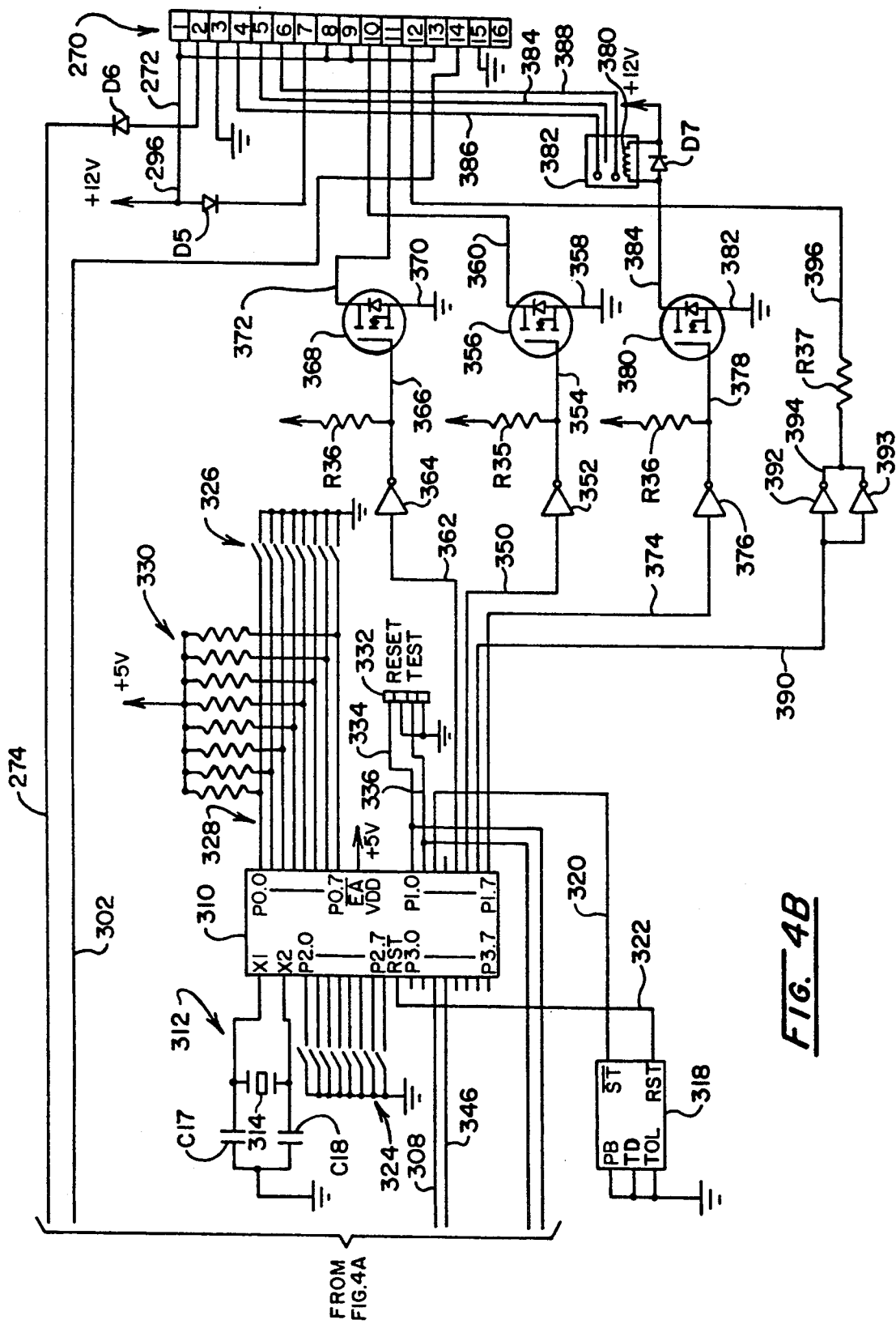

Referring to FIGS. 4A and 4B an electrical schematic diagram is provided showing a microprocessor based implementation of the control. Where appropriate, common lines or components between figures retain common identifying numeration. In this regard, a barrier block or junction is represents in FIG. 4B at 270 having connector positions labeled 1 through 16. Of the positions for this junction, the 12 volt d.c. input earlier described at 66 as well as the 24 to 36 volt d.c. input earlier described at line 62 are represented at blocks 1 and 2, while ground is represented at junction block 3. A relay wiper of the component described generally at 382 is represented at block 5, while the normally open relay contact is shown at block 6. The positive lamp, horn, and LED 44 outputs are shown respectively at blocks 7 through 9. Correspondingly, the lamp output line described earlier at line 144 is represented at block 10; the negative horn output represented earlier at line 170 is shown coupled at block 1 1; and the negative LED 44 output earlier described at line 262 is shown at junction block 12. The +12 v d.c. power source to the proximity detector 28 is shown at junction block 13, while the proximity signal developed as described earlier at line 122 is represented at junction block 14. Finally, ground for the proximity detector is represented at junction block 15.

Where a 24 to 36 volt battery power source is available from vehicle 10, then a connection is made from junction 270 and block 2 through lines 272 and 274 to the input of a switching 276 (FIG. 4A). Provided, for example, as a type LM2578N device marketed by National Sen Corp., regulator 276 converts the 24 to 36 volt input, if so utilized, from line 274 to 12 volts d.c. at line 278. Line 278 is coupled via line 280 to resistors R30 and R31 which are tapped at line 282 for connection to the comparator minus input to device 276. Similarly, capacitors C8 and C9 are additionally coupled to the CAP input to device 276 via line 284, while the ground input thereto is provided from line 286. The limit input to device 276 is coupled to line 274 through resistor R32, while output line 278 is seen to incorporate inductor L1 and line 280 is seen associated therewith in conventional fashion in conjunction with Shottky diode D2 and capacitor C10. Line 278 is seen directed to line 298 incorporating blocking diode D3 and extending to one input of voltage regulator 290. Device 290, for example, may be provided as a type LM7805 marketed by National Semi-Conductor, Inc. and provides a regulated 5 v output at its output line 292. Capacitor C11 coupled between line 298 and ground and capacitors C12-C14 coupled between line 292 and ground provide conventional oscillatory control and filtering, while line 294 couples ground to the REF terminal of device 290. A Zener diode D4 and associated oscillation controlling capacitor C15 provide a shunt to ground from line 278 should the regulated output thereat exceed a predetermined voltage value, for example 15 volts. Where the vehicle 10 is configured having a 12 v battery supply, then such 12 volts are derived at junction 270 and block 1 and are provided at fine 296 and, additionally, by coupling, not shown, to line 298 extending to line 288 intermediate blocking diode D3 and regulator 290. Thus, 12 volts asserted at this position will be regulated at device 290 for providing the +5 v regulated output at line 292. Both line 296 and earlier-described line 272 are seen extending through respective diodes D5 and D6 to the positive lamp output block 7 of junction 270. The proximity detector output signals earlier described in conjunction with device 28 are directed from junction 270 at block 14 as represented by line 302 to the input of an optoisolator 304. Isolator 304 may be provided, for example, as a type H11L1 and includes a Schmitt trigger action comparator. As before, the device serves to respond to current rather than voltage from the proximity detector 28 in view of the unusually highly noisy environment in which vehicle 10 is called upon to operate. Resistors R32 and R33 at the input of the device 304 are employed to set the current threshold thereto and provide for the driving of a diode within the isolator. Capacitor C16 coupled between line 302 and +12 v serves for noise suppression. The output of isolator 304 is submitted via lines 306 and 308 to the P3.2 input of a microprocessor 310. Line 306 is seen to extend through pull-up resistor R34 to +5 v. Device 310 may be provided, for example, as a type 8751 CMOS controller marketed, for example, by Signetics, Co. The X1, X2 terminals of device 310 receive a 7.3728 MHz input from crystal controlled oscillator network 312 which includes crystal 314 and capacitors C17 and C18. Device 310 further performs in conjunction with a power monitor 318. Device 318 may be provided, for example, as a type DS1232 power monitor marketed by Dallas SemiConductor, Inc. The strobe input thereto, /ST is coupled via line 320 to the P1.2 terminal of microcontroller 310, while the reset (RST) output thereof is connected via line 322 to the reset input of device 310. Monitor 318 functions to provide a reset input to microcontroller 310 in the event of a power supply voltage drop below 5 v. Additionally, the device provides a watchdog function, carrying out a reset function in the event of a failure of device 310 to provide a periodic strobe signal at line 320.

Binary information representing the transmitting code of remote resetting device 46 (FIG. 2) is provided to the microcontroller 310 from a d.i.p. switch array 324. The eight, hand-selected inputs from switch array 324 are directed to the P2.0-P2.7 ports of device 310. In similar fashion, a d.i.p. switch array 326 is manually adjusted to provide a binary value representing the threshold of speed wherein the second perceptible output, for example the horn, is actuated. This corresponds with a speed S2 as described earlier herein and will be seen to represent a time of revolution value, T1. The eight conditions represented by switch array 326 are directed by a line array 328 to the P0.0-P0.7 ports of microcontroller 310. Each of the lines within array 328 is coupled to a +5 v pull-up resistor at resistor array 330. Adjustment of the switch components of array 326 is made in consideration of the selected threshold speed S2 as well as the diameter of wheel 18. Of course, other forms of speed input may be employed with the instant control arrangement. A key actuated reset may be provided through blocks or positions 1 and 2 of a receptacle 332 to the microcontroller 310. In this regard, block I of receptacle 332 is seen coupled via line 334 to the P1.0 port of device 310, while block 2 thereof is coupled to ground. In similar fashion, a test button may be employed which is connected to device 32 (not shown) and is, in turn, coupled to the instant control circuit via blocks 3 and 4 of receptacle 332. In this regard, block 3 of receptacle 332 is shown coupled via line 336 to the P1.1 port of device 310, while corresponding block 4 of the junction 332 is coupled to ground.

Reception of the coded IR signals broadcast from remote reset component 46 (FIG. 2) are received by a receiver/demodulator module 340. Device 340 may be provided, for example, as a type GP1U52X receiver/demodulator marketed by Sharp Corporation. The device is coupled to the +5 v supply via line 342 and to ground via line 344 and includes a photodiode which, in turn, is coupled with an amplification stage, the output of which is coupled capacitively to a limiter stage, which, in turn, is capacitively coupled with a band pass stage and, in turn, demodulator, integrator, and comparator stages to provide a coded output signal at line 346 which is directed to the P3.3 port of microcontroller 310.

Based upon the speed data received, microcontroller 310 will provide an actuating output at its P1.5 port and line 350 to actuate the lamp indicator representing a first speed threshold (S1) being reached. Line 350 is seen being directed through an open collector inverter 352 which may be a type 74LS05, which, in turn, provides an output at line 354 to an FET transistor 356. Line 354 is seen coupled through pull-up resistor R35 to +12 v. The source terminal of transistor 356 is coupled via line 358 to ground, while the drain terminal thereof is coupled via line 360 to block 10 of receptacle 270 to provide a lamp actuation. In similar fashion, a horn actuation is carried out by a signal provided from port P1.4 of device 310 at line 362. Line 362, in turn, is seen to extend to the input of an open collector inverter 364, the output of which at line 366 is coupled to the base of FET transistor 368. Line 366 additionally is seen to be coupled to +12 v through pull-up resistor R36. The source terminal of FET transistor 368 is coupled to ground via line 370, while the drain terminal thereof is coupled via line 372 to block 11 of receptacle 270 to provide a horn actuating output. A latch control providing for such activities as disabling the ignition of vehicle 10 is provided by a signal deriving from port P1.7 of microcontroller 310 which, in turn, is coupled via line 374 to open collector inverter 376. The output of device 376 at line 378 is coupled to the base of FET transistor 380 and through pull-up resistor R36 to 12 v. The source terminal of transistor 380 is coupled via line 382 to ground, while the drain terminal thereof is coupled to the winding 380 of an SPDT relay 382. Line 384 is seen coupled to +12 v and an inductive spike protective diode D7 is seen coupled across winding 380. The wiper of device 382 as coupled with line 384 may provide contact with the normally closed or normally open terminals thereof. In this regard, the normally closed terminal is coupled via line 386 to block 4 of receptacle 270, while the normally open contact position of device 382 is coupled via line 388 to block 6 of receptacle 270. Select activation of light emitting diode (LED) 44 (FIG. 2) is provided by signals emanating from port P1.6 of microcontroller 310 which, in turn, is coupled via line 390 to the inputs of paired open collector inverters 392 and 393. The outputs of inverters 392 and 393 are coupled via lines 394 and 396 to block 12 of receptacle 260. A current limiting resistor R37 is seen positioned within line 396.

Figure 5A:
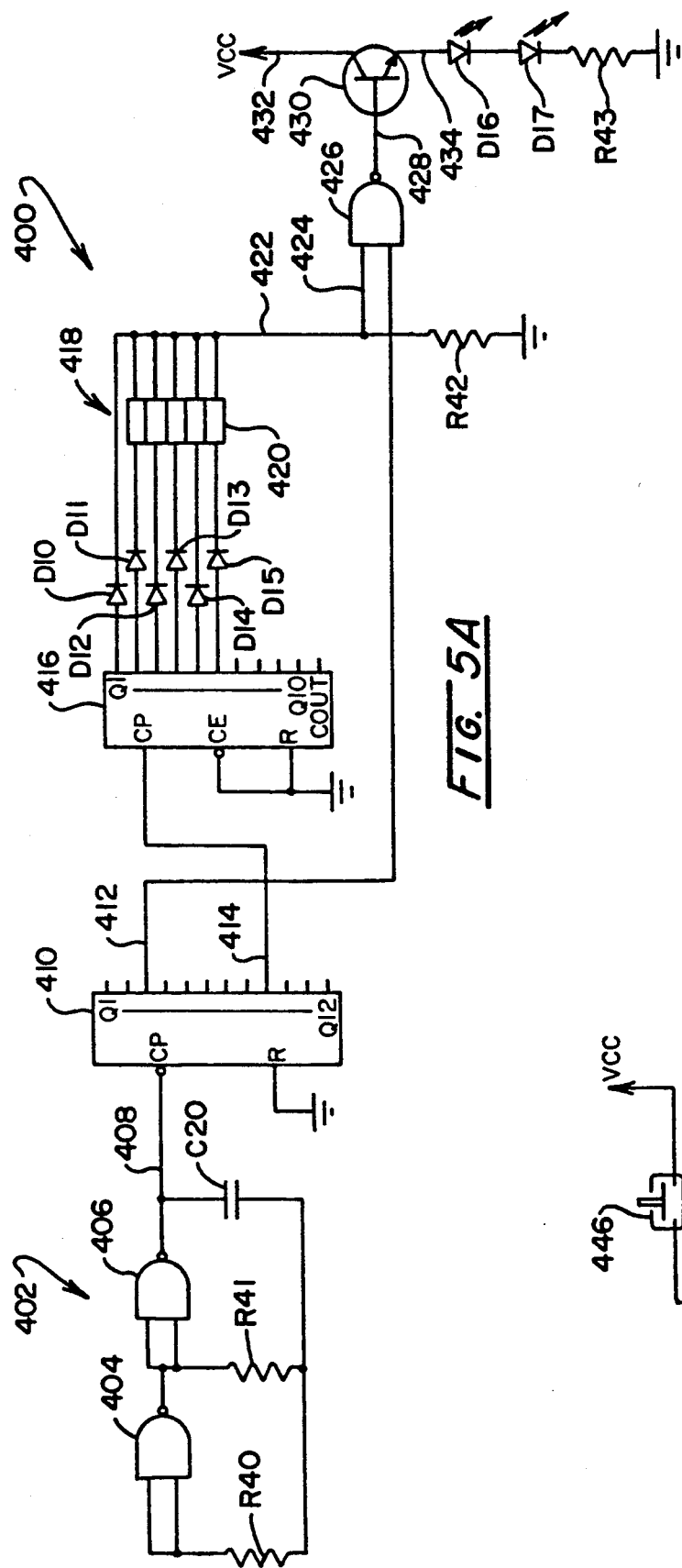
FIGS. 5A and 5B represent an electrical schematic diagram of the control circuit of a hand-held IR resetting device employed with the invention.

Referring to FIG. 5, the circuit carrying out the coded transmission function for hand-held reset device 46 is revealed at 400. Circuit 400 includes an astable mulvibrator represented generally at 402 which is configured to create a nominal 302 KHz signal. Multivibrator 402 is comprised of two NAND gate stages 404 and 406 which are intercoupled in conventional fashion with resistors R40 and R41 to provide the noted frequency defined signal at output line 408. Line 408 is directed to the clock (CP) input of a binary counter 410. Counter 410 produces an output at its terminal Q3 and line 412 which is nominally at 38 KHz frequency. Additionally, the counter 410 produces an output at its terminal Q9 and line 414 which is nominally 500 Hz. Line 414 is seen coupled to the clock (CP) input of a decade counter-decoder 416. Counter-decoder 416 accepts this nominal 500 Hz signal and decodes it into a sequence of pulses at its Q1-Q6 output ports. These ports are seen coupled to the discreet leads of line array 418, which, in turn, incorporate discrete diodes D10-D15. The last five of the leads of array 418 are seen extending through jumper block 420 and all of the leads of array 418 extend to line 422 which extends through resistor R42 to ground and is coupled via line 424 to one input of NAND gate 426. By selecting the appropriate jumper 420 conditions, a binary code with a binary 1 start bit is generated in sequence at line 422. Line 412, emanating from counter 410 and carrying the noted nominal 38 KHz signal is directed to the opposite input to gate 426 to modulate the resultant code sequence output thereof at line 428. This serial code string at line 428 is applied to the base of transistor 430, the collector of which is coupled to Vcc by line 432 and the emitter of which is coupled to line 434 which includes an infrared light emitting diode (LED) D16, a serially coupled red light emitting diode (LED) D17, resistor R43, and ground. Diode D17 provides a visible perception of the operation of circuit 400.

Figure 5B:
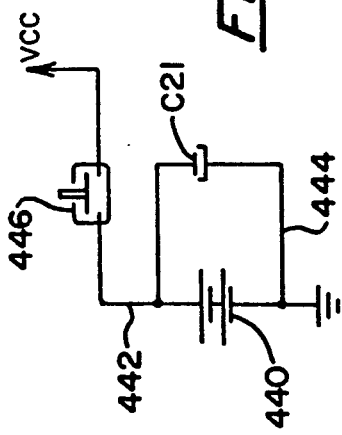

Looking to FIG. 5B, the push-button configuration of the hand-held device 46 is revealed. Battery power supply is provided for the unit 46 by battery 440 coupled between ground and Vcc within line 442. Stabilizing capacitor C21 within line 444 is coupled across the battery 440 and a push-button switch 446 is seen coupled between the battery and Vcc. Thus, upon the manual depression of switch 446, the circuit 400 is powered to produce a coded ouput from diode D16.

Figure 6:
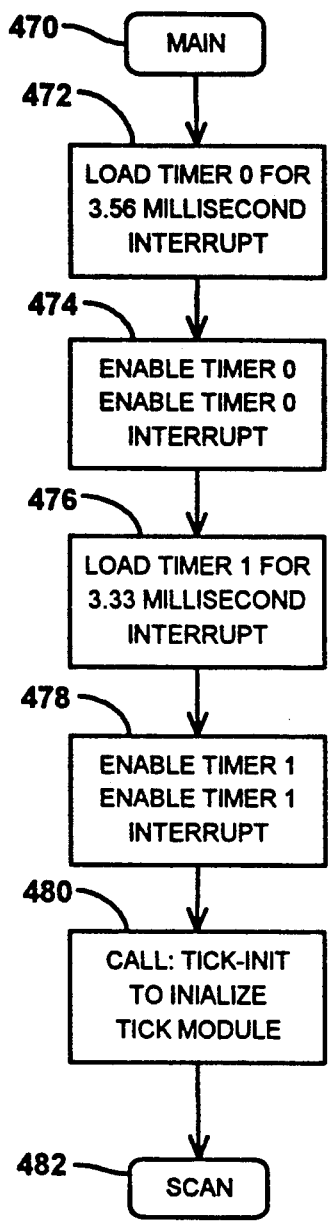
FIG. 6 is a flow chart showing a main program employed with the control circuit of the invention.

Referring to FIG. 6, a flow chaff representing the general or main program of control carried out by microcontroller 310 is revealed. This is a modular program having basically three different modules and performing in conjunction with two timers. Looking to the figure, this main program representation is shown entered at node 470, whereupon, as revealed at block 472, a timer designated "0" is loaded. This Timer is utilized to determine the speed of the vehicle 10 and, generally, develops a 3.56 m.s. interrupt. The program then progresses as represented at block 474 wherein Timer 0 is enabled and the timer 0 interrupt is enabled. Then, as revealed at block 476, a next timer, timer 1, is loaded for providing a 3.33 m.s. interrupt. This is a general purpose timer that, inter alia, times latch intervals, baud rates for IR reception and the like. As represented at block 478, Timer 1 is enabled and the Timer 1 interrupt is enabled, whereupon, as represented at block 480, a "TICK-INIT" program is called for carrying out the initialization of a TICK module. The latter module will be seen to handle interrupt procedures in the control system. Finally, the main programs calls a "SCAN" module.

Figure 7A:
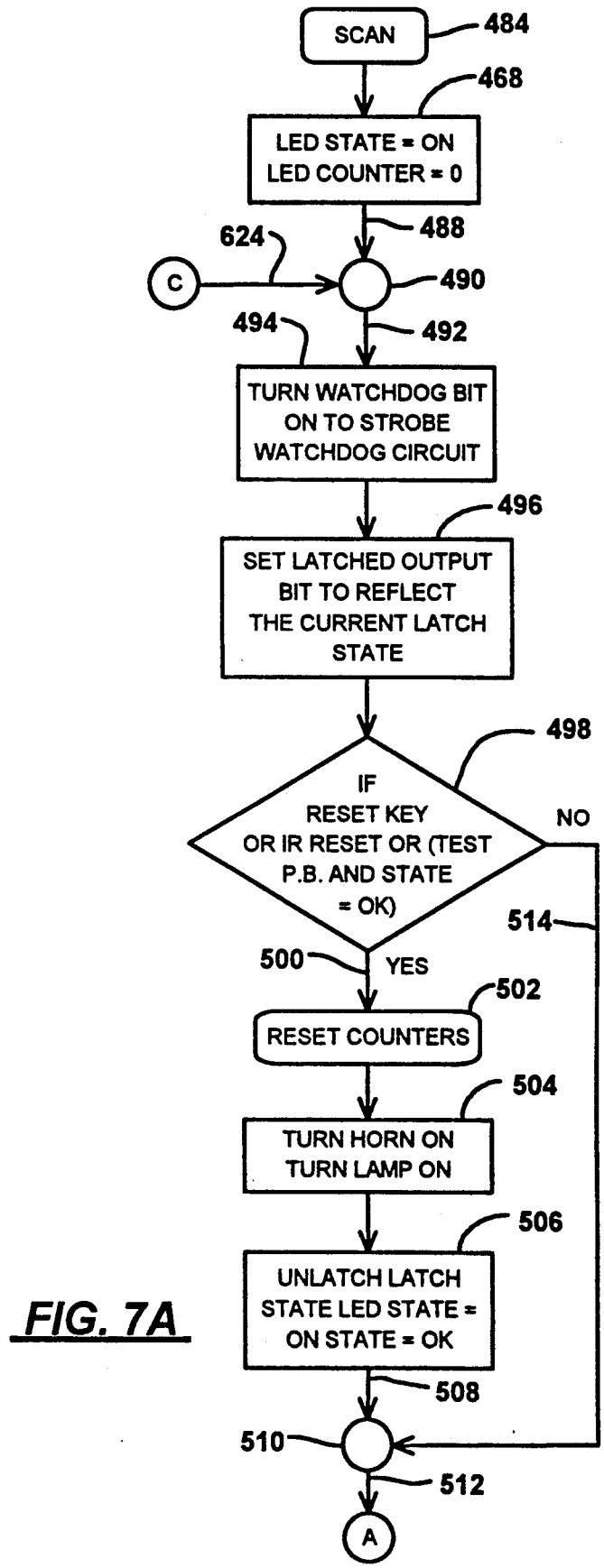
Figure 7C:
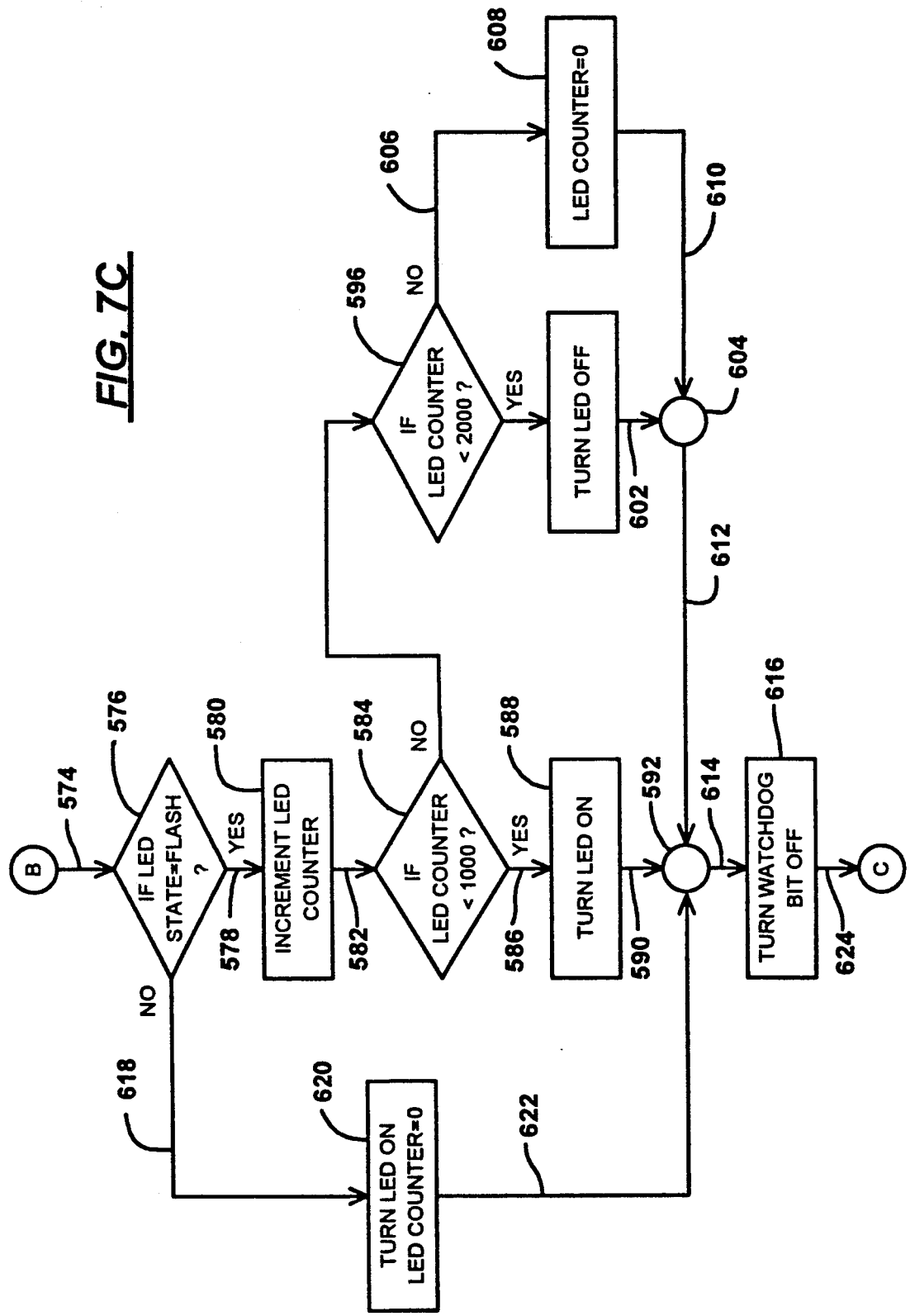

Looking to FIGS. 7A, 7B, and 7C the SCAN module is represented in flow diagrammatic fashion as commencing at node 484. This module is continuously looping incorporating state machine logic and the like. As represented at block 486, LED 44 is assigned a steady on state and an LED counter utilized to establish a flashing condition for the diagnostic device is set to zero. The routine then continues as represented at line 488, node 490, and line 492 to the instructions as represented at block 494. This instruction provides for turning on a watchdog bit for the purpose of strobing the watchdog feature of the power monitoring circuit 318. Next, as represented at block 496, the latched output bit is set to reflect the current latch state. This latch state is concerned with the functioning of relay 382. The relay may be employed as an option to disable the ignition circuit of vehicle 10 following an excessive speed S2 occurring for a predetermined interval such as 3 seconds or the like. The routine then proceeds to a decision branch as represented at block 498 wherein a determination is made as to whether a reset key or the like has been actuated, or if an IR reset broadcast has been received from hand-held module 46, or whether a test push-button has been actuated under a condition where an OK state is at hand. The latter, OK stage, is one in which no latched or overspeed condition is at hand. Without such a requirement, the operator could merely reset the system by pushing the test button once a speed limit had been exceeded.

In the event of an affirmative determination at branch 498, as represented at line 500 and instruction 502, the counters are reset for the reset condition at hand. The routine then continues, as represented at block 504 to turn on the horn and lamp to assure that both are in working order. In effect, the reset key, an IR derived reset or the test push-button can be used to carry out testing of those perceptible functions. The routine then continues to the instructions of block 506 wherein any latch state is unlatched, the designated state for LED 44 is made to an on condition and the state of the control system is established as "OK".

The program then proceeds as represented by line 508, node 510, and line 512, the routine continuing to the node A location. However, if the determination made at decision branch 498 is in the negative, then as represented by line 514 extending to node 510, the reset functions are not established and the routine continues to node A.

Looking to FIG. 7B, that portion of the scan routine module which, in effect, implements a state machine logic is revealed. The state conditions, in general, are developed or set by the PROX-INTER routine module and the TICK interrupt service routine. The latter routines perform in correspondence with the instantaneous evaluation of speed of vehicle 10. In effect, the above routines will change state in a background software logic, while the instant routine of SCAN develops actuating outputs in a foreground control region. In the figure, the state machine implementation is commenced with line 520 and decision block 522 wherein a determination is made as to whether the state is an "ignore" state. If that is the case, then as represented at line 524 and block 526, nothing is done. The routine then progresses as represented at line 528 to node 530 which is, in effect, an end of the state machine logic. In the event that the ignore state is not present, then as represented at line 532 and decision block 534, a determination is made as to whether the system is in a "horn/lamp" state. In this state, both the horn and the lamp are activated. In the event of an affirmative determination, then as represented at line 536 and block 538, the horn behind grid 42 is turned on and the lamp behind lens 40 is turned on (FIG. 2). Ibis portion of the program then continues as represented at lines 540, 528, and node 530. In the event of a negative determination at block 534, then as represented at line 542 and block 544, a determination is made as to whether a "lamp state" is present. In the event that it is, then as represented at line 546 and block 548, the horn is turned off and the lamp is turned on. The routine then progresses as represented at lines 550 and 528 to node 530. Where the determination at block 544 is in the negative, then as represented at line 552 and decision block 554, a determination is made as to whether a state of "OK" is present. In the event that it is, then as represented at line 556 and block 558, the horn is turned off and the lamp is turned off. The routine then continues as represented at lines 560 and 528 to node 530.

Where a negative determination is made in conjunction with block 554, then as represented at line 562 and decision block 564, a determination is made as to whether a "latched" state is present. In the event that it is, then as represented by line 566 and block 568, the horn is turned on and the lamp is turned on. The routine then progresses as represented at lines 570 and 528 to node 530. In the event of a negative determination at block 564, then as represented at line 572 the routine continues as represented at node 530, line 574 and node B. The remaining logic, as represented in FIG. 7C, is associated with the control of diagnostic LED 44. Accordingly, as represented at decision block 576 an initial determination is made as to whether the LED 44 is in a flashing state. It may be recalled that the LED 44 is made to periodically flash with the occasion of a wheel rotation induced signal from the proximity detector 28. Where such a signal has not been received for a predetermined interval, for example 15 mintues, then LED 44 is turned to a steady state or on condition by a TIMER INTR routine module. The instant routine component simply flashes the LED 44 in a flash state and holds it in a steady state in an on state. Accordingly, with an affirmative determination at decision block 576, then as represented at line 578 and block 580, the LED counter, which was initialized or set to zero in accordance with the activities associated with block 486, is incremented. Then, as represented at line 582 and decision block 584, a determination is made as to whether the LED counter value is less than 1,000. If an affirmative determination is made, then as represented at line 586 and block 588, the LED 44 is turned on and the routine progresses as represented at line 590 to node 592. Where the LED counter has a value greater than 1,000, then as represented at line 594 and decision block 596, a determination is made as to whether the LED counter has a value of less than 2,000. Where that value is less than 2,000, then as represented at line 598 and block 600, the LED 44 is turned off. The routine then continues as represented at line 602 to node 604. Where the LED counter has a value greater than 2,000, then as represented at line 606 and block 608, the LED counter is reset to zero and as represented at line 610, the routine progresses to node 604. From node 604, as represented at line 612, the routine returns to node 592 and, as represented at line 614 and block 616, the watchdog bit, which was turned on in conjunction with the instructions at block 494, is turned off.

Where the determination at decision block 576 is in the negative, and the LED state is not one of flash, then it must be an on state and, as represented at line 618 and block 620, the LED is turned on in steady state fashion and the LED counter is set to zero. The routine then progresses as represented at line 622 to node 592, line 614 and block 616 to carry out the turning off of the watchdog bit. As is apparent, the routine path terminating with line 622 is one employed when a reset has occurred with a reset key or through an IR reset code sequence or where a proximity signal has not been received within the noted predetermined period such as 15 minutes. The instant module is a continuously looping one and, as represented at line 624, the routine returns to node 490 as described in conjunction with FIG. 7A.

Referring to FIG. 8, the TICK INIT routine is illustrated in flow diagrammatic fashion. It may be recalled that this routine was called in the main program described in conjunction with FIG. 6 at block 480. This routine functions to set all initial values for the variables treated by the control system. The routine is seen entered from module 640, whereupon an initialization of a variety of functions is carried out as represented by block 642. These functions include the establishing of the state as "okay". Latch, reset, and IRRX (transmission) flags are set to an off state. Further, the IR timer and the latch timer are set to zero and the horn, lamp, and IR counts are set to zero values. Additionally, the prox timer for deriving 3.56 ms time increments is set to zero and the LED timer is set to zero. The latter timer provides, for example, the 15 minute interval time out. The routine then progresses to the instructions of block 644, a high priority is set with respect to the proximity interrupt from which speed is determined, as well as the TICK interrupt handlers inasmuch as high accuracy is required for those functions.

The routine then progresses to the instructions at block 646 wherein the proximity interrupt is set to occur on the falling edge of each proximity signal and this interrupt is enabled. Finally, as represented at block 648, the infrared (IR) interrupt is set to occur on a falling edge of an IR signal and that interrupt is also enabled. The routine then exits as represented at node 650.

Referring to FIG. 9, a small routine or resetting state of all counters is described. This routine is entered as represented at node 660 and, as represented at block 662, the latch timer, the horn counter, the lamp counter, the proximity timer and the LED timer are all set to zero. The routine exits as represented at nodes 664.

Figure 10B:
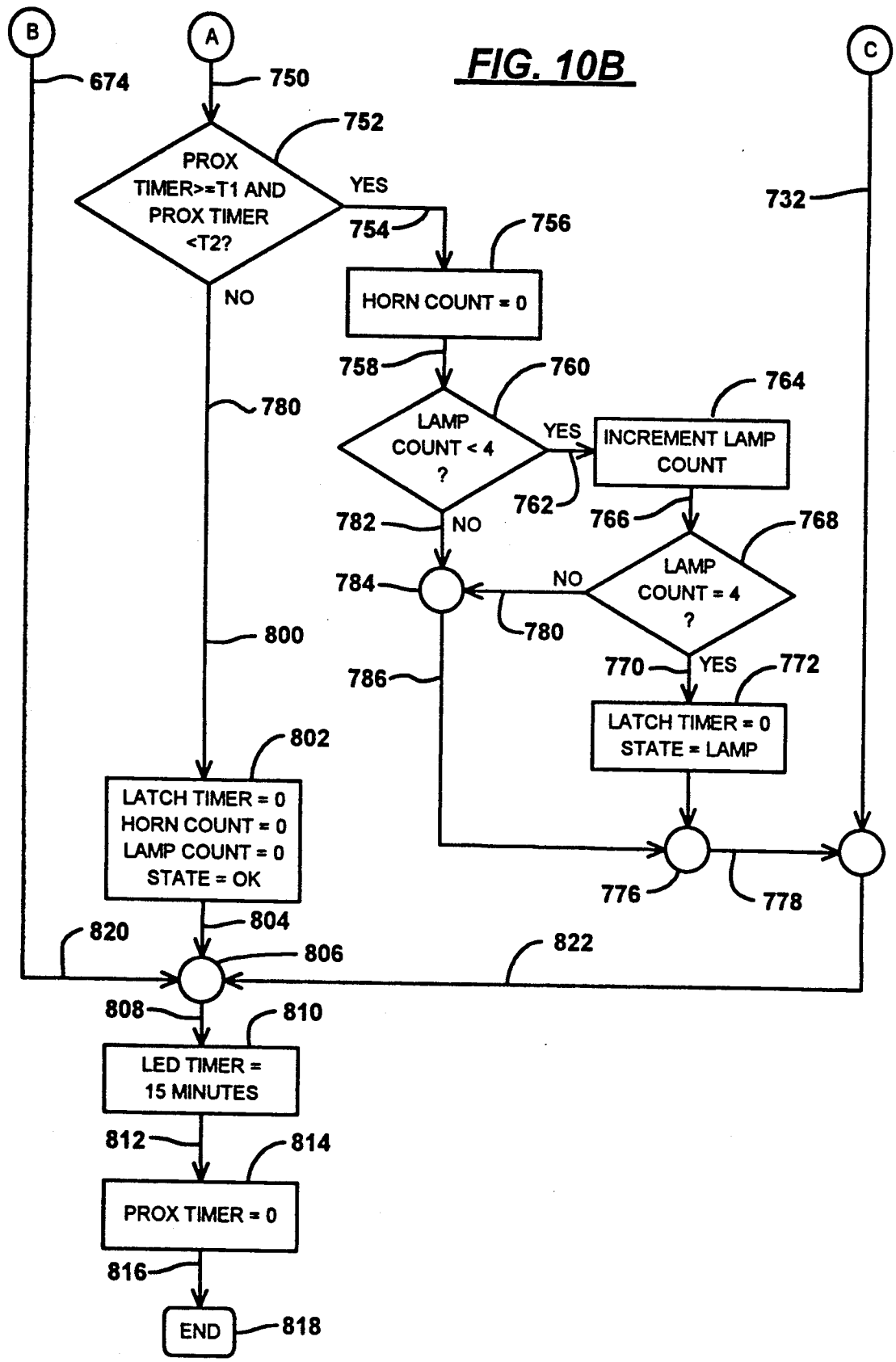

Referring to FIGS. 10A and 10B, the PROX INTR routine module is illustrated in block diagrammatic manner. This routine is associated with the interrupt which occurs each time the flag 26 passes and actuates the proximity detector 28 or at such time as an equivalent speed related signal is generated. The routine commences with the inquiry represented at block 672 wherein an inquiry is made as to whether the system is in a latched state, a condition wherein the "horn" speed has been exceeded and that excess speed has existed for the requisite allowable time, for example, 3 seconds and the horn has come on and the system is latched. Where that is the case, the only recourse remaining is a form of reset from supervisory personnel. Accordingly, with the presence of an affirmative determination, as represented at line 674 and node B, no further proximity based action occurs. In the event of a negative determination at block 672, then as represented at line 676 and decision block 678, a determination is made as to whether the proximity timer has a value less than a time interval value T0. It may be recalled that the PROX timer is an accurate 3.56 ms based timer. The time value T0 is set to a very short interval which would represent an unrealistic speed for vehicle 10. The value would correspond with a proximity signal or speed signal which is quite high and which, therefore, must be noise. An additional situation may occur wherein the wheel as at 18 in FIG. 1 is so oriented such that the flag 26 is adjacent the proximity detector 28 and a form of jitter occurs which is unrelated to vehicle speed. Where the test represented at block 678 is in the affirmative, then a logic "ignore region" is established and, as represented at line 680 and block 682, the latch timer, the horn count, and the lamp count are set or reset to zero and the state is established as OK. The routine then progresses to node C as represented at line 684. The PROX timer, in effect, is an accumulator of time based values developed about 3.56 ms intervals and, thus, a next PROX timer evaluation is designated T1, which represents a threshold level corresponding with horn/light speed S2. This component of the proximity interrupt routine may be referred to as a "horn/lamp region". Where the determination at block 678 is in the negative, then as represented at line 686 and block 688, a determination is made as to whether the proximity timer value is greater than T0 but less than T1. If this condition is true, then as represented at line 690 and block 692, a determination is made as to whether vehicle 10 has been in this horn/lamp region for four passes of the flag 26 across the proximity detector 28. Accordingly, the determination at block 692 is as to whether the horn count is less than 4. If an affirmative determination is made, then as represented at line 694 and 696, the horn count is incremented and, as represented at line 698 and decision block 700, a test is made as to whether the horn count is now 4. If it is not, the routine continues as represented at line 702, node 704, and line 706. Line 706 represents the logic occurring where a negative determination is made with respect to the horn count question posed at decision block 692. Where an affirmative determination is made with respect to the horn count in connection with decision block 700, then, as represented at line 708 and block 710, a time-out by the latch timer commences, for example, providing a 3 second time-out or such predetermined interval which represents the limits for this high speed prior to the entry of the system into a latched condition. Additionally, a horn/lamp state is established and, as represented by line 712, node 714, and line 716, the routine progresses to the inquiry represented at block 718. The inquiry posed therein determines whether or not the lamp count is less than 4. This test requires that the lamp speed, S1, be exceeded at least four times before the lamp is turned on. In the event of a negative determination, then as represented by line 720, node 722, line 724, node 726, line 728, node 730, and line 732, the routine path extends to node C. Where the determination at block 718 is in the affirmative, then as represented at line 734 and block 736, the lamp counter is incremented. The routine then progresses, as represented at line 738 to the decision block 740 wherein a determination is made as to whether the lamp count has reached a value of 4. Where it has not, then as represented at line 742, the routine progresses to node C. On the other hand, where an affirmative determination is made with respect to block 740, then as represented at line 744, the latch timer is set to a zero value, inasmuch as no latch-up follows the actuation of the lamp and the state of the system is set to a lamp state. The routine then progresses as represented by line 748 to node C.

Where the determination at decision block 688 is that the PROX timer value does not lie between the values T0 and T1, then as represented by line 750, node A and decision block 752 as shown in FIG. 10B, a determination is made as to whether the proximity timer value is greater than T1 but is less than value T2. The latter value, T2, corresponds with the threshold speed representing a condition of overspeed but calling for the illumination of the warning lamp. Thus, where the proximity timer value is between the horn speed threshold T1 and the lamp speed threshold T2, as represented by line 754 and block 756, the horn count is cleared or reset to zero. This accommodates for a condition, for example, where the vehicle has been at speed S2 and then returns to speed S1 before the horn count reaches a value of 4. The routine then progresses as represented at line 758 and block 760 wherein a determination is made as to whether the lamp count is less than 4. In the event that it is less than the value of 4, then as represented at line 762 and block 764, the lamp count is incremented. The routine then continues as represented at line 766 to a determination at block 768 as to whether the lamp count is now equal to 4. Where that equivalency is present, then as represented at line 770 and block 772, the latch timer is set to zero for reasons given in connection with block 746 and a lamp state is established. The routine then progresses as represented by line 774, node 776, and line 778 to line 732 extending from node C. Where a negative determination is made with respect to the inquiry represented at block 752, then the routine progresses as represented by line 780. Correspondingly, where a negative determination is made with respect to block 760, then as represented at line 782, node 784, and line 786, the routine progresses to line 732 extending from node C. Similarly, a negative determination with respect to the inquiry at block 768 results in a routine path represented by line 780 extending to node 784 and thence to line 732 extending from node C. It may be observed that the routine as it progresses from decision block 752 is concerned with a logic "lamp region".

Line 780 is the determination of a path wherein all of the proximity timing tests are false and thus, an "OK region" of logic is developed. In this regard, note that line 780 extends to block 802 carrying instructions for setting the latch timer as well as the horn and lamp counts to zero are provided, and, additionally, the state is established as OK. The routine then progresses as represented by line 804, node 806, line 808, and block 810. At block 810, the LED timer is reset to a 15 minute time-out. As represented at line 812 and block 814, the routine next sets the PROX timer to a zero value, and as represented at line 816 and node 818, the PROX INTR routine is ended. In similar fashion, line 674 extending from node B and indicating latch flag condition, is seen to lead to node 806 resulting in the carrying out of the instructions represented at blocks 810 and 814. Correspondingly, lines 732 and 822 extending from node C carry out the same ending instructions.

Figure 11A:
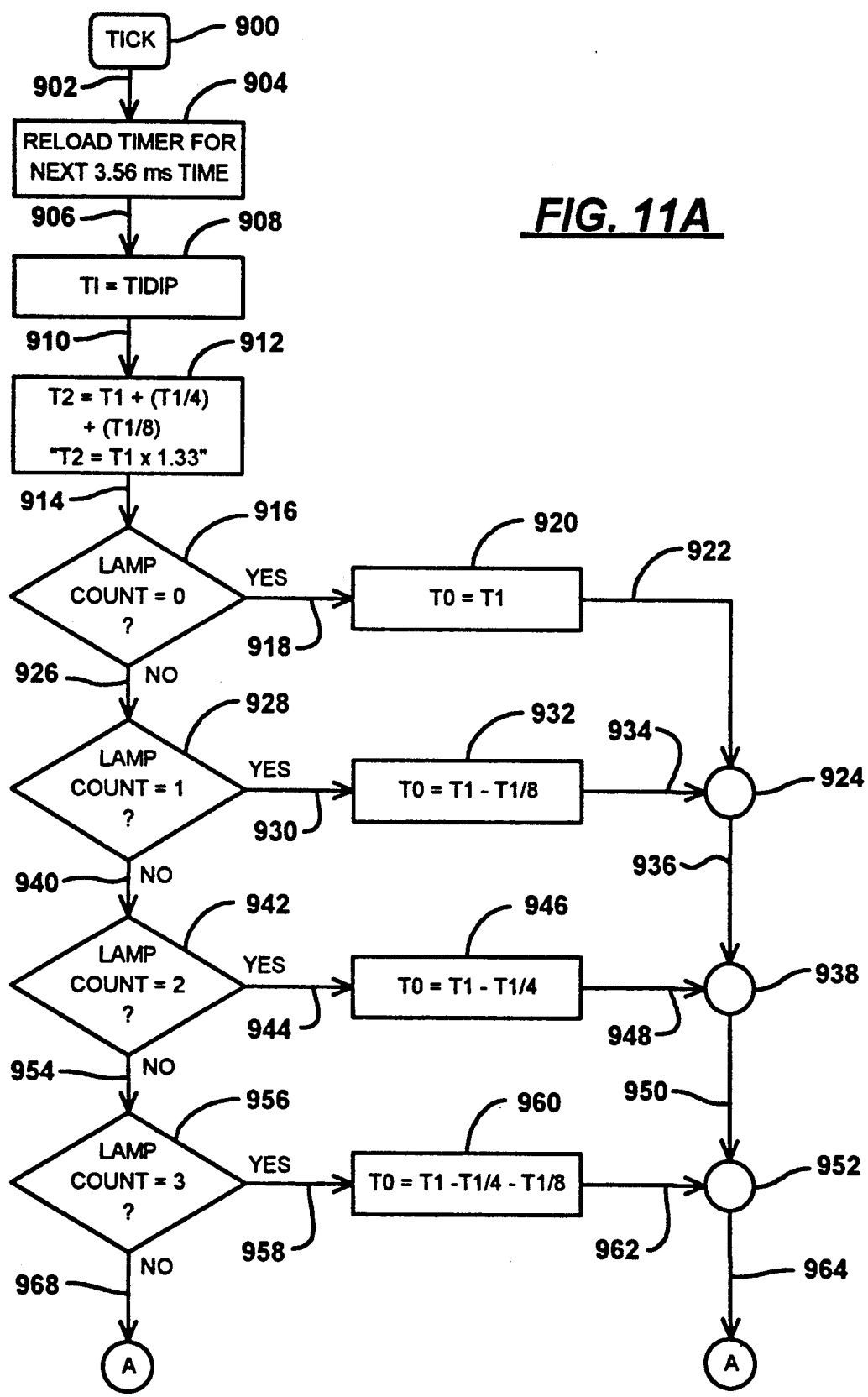
FIGS. 11A and 11B are flow charts illustrating a TICK routine employed with the control system of the invention.
Figure 11B:
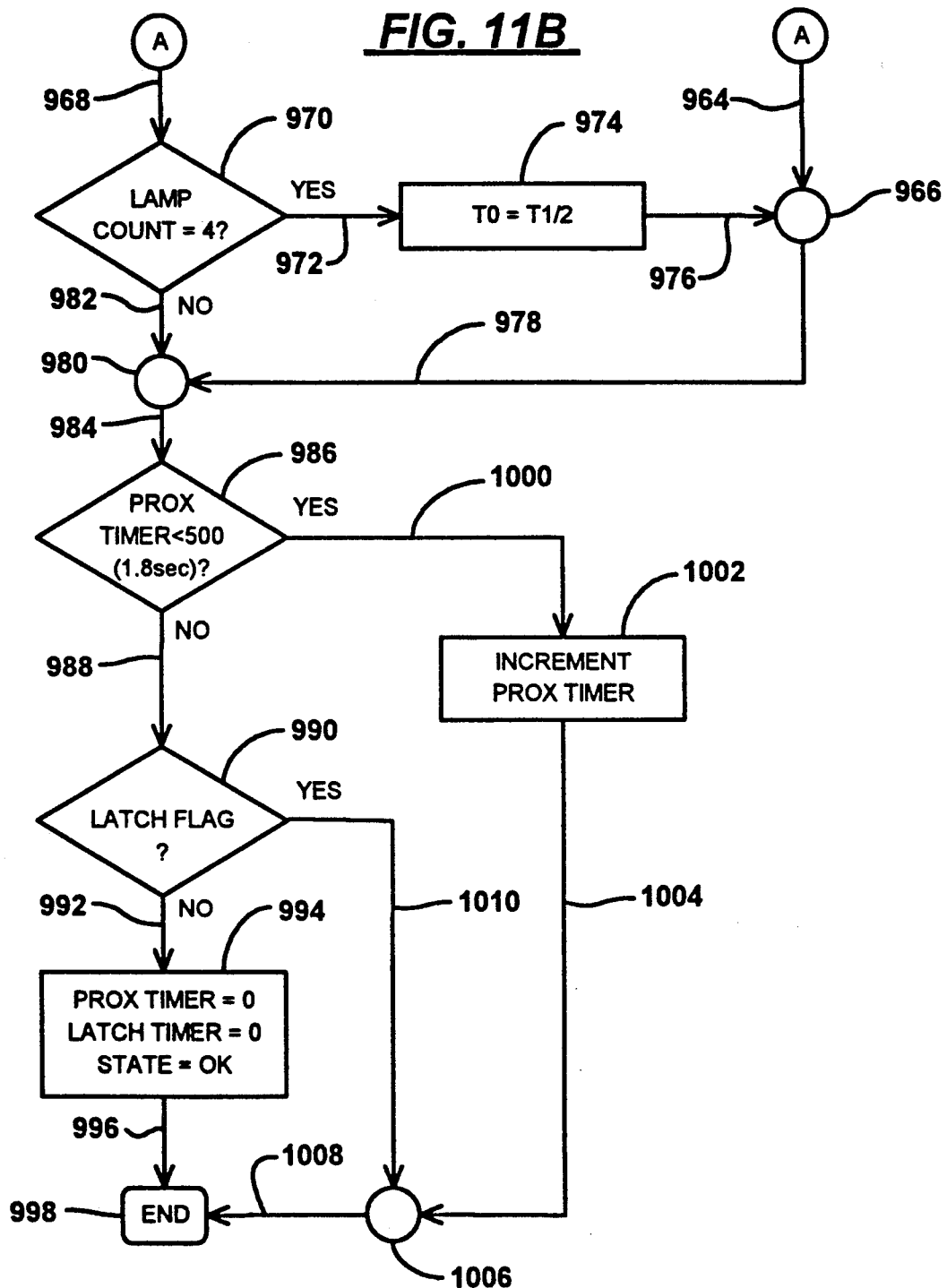

Looking to FIG. 11, the TICK routine is illustrated in flow diagrammatic fashion. This routine commences as represented at node 900, line 902, and block 904 with the instruction to reload the 3.56 ms interrupt timer to commence timing of the next 3.56 ms time. This initial or early reloading assures that the timer will be as accurate as possible. As represented at line 906 and block 908, then the value T1 is set as the dip switch manually established value T1DIP. It may be recalled from the description of FIG. 4 that this binary value is set by management with respect to switch array 326 and corresponds with speed S2 or the horn speed. Next, as represented by line 910 and block 912, the value of time T2 or the lamp speed value representing speed S1 is developed. Value T2 is preferably about the value, T1 multiplied by 1.33. That value is proximated utilizing integer arithmetic to facilitate software computation. In effect, the value T2 is made equal to the value of T1 with the addition of the values of T1 divided by 4 and T1 divided by 8. This procedure is carried out by a straightforward shifting procedure. The routine then continues as represented at line 914 whereupon control system calculates the value of T0 in a variational fashion predicated upon the presence of a lamp count. In effect, an incremental time window is established which, upon commencing to be opened, gradually permits a determination of horn speed S2 to be made. The closing out of a time value T1 where there has been no lamp speed or speed SI achieved, serves to avoid response to spurious noise signals or similar phenomena. The approach is predicated upon the observation that vehicle 10 will pass through the lamp speed S1 threshold before reaching horn speed S2.

Line 914 is seen directed to an inquiry represented at block 916 wherein a determination is made as to whether the lamp count is zero. In the event of an affirmative determination, then as represented at line 918 and block 920, the interval T0 is made equal to the interval T1. This mandates a negative determination at the inquiry represented by block 688 in FIG. 10A. The routine then progresses as represented by line 922 and 924. Where the lamp count is not zero, then as represented at line 926 and decision block 928, a determination is made as to whether the lamp count is 1. In the event the lamp count is 1, then as represented by line 930 and block 932, the value T0 is made equal to the value of interval T1 less the value T1/8. Thus, with the presence of a first lamp speed indication, the window or opportunity for a determination of horn speed S2 is slightly accessible. The routine then continues as represented by line 934, node 924, and line 936 extending to node 938. In the event of a negative determination with respect to the inquiry at block 928, then as represented by line 940 and decision block 942, an inquiry is made as to whether the lamp count is equal to 2. In the event that it is, then as represented by line 944 and block 946, the value of T0 is made equal to the value of the interval T1 less ¼ of that value. Thus the noted window is open further. The routine then continues as represented by line 948, node 938, line 950 and node 952. In the event of a negative determination at decision block 942, then as represented by line 954 and decision block 956, a determination is made as to whether the lamp count is equal to 3. Where it is equal to 3, then as represented by line 958 and block 960, the value of T0 is made equal to the value of T1 less ¼ of the value of T1 and further less ⅛ of the value of T1. Thus, the window of accessibility to finding a horn speed S2 opens further. The routine then continues as represented by line 962, node 952, line 964, node A and node 966. Where the inquiry posed at block 956 results in a negative determination, then as represented by line 968 and block 970, an inquiry is presented as to whether the lamp count is equal to 4. This represents the maximum lamp count and indicates that lamp speed S1 has been achieved by vehicle 10. In the event of an affirmative determination with respect to the inquiry, then as represented at line 972 and block 974, the value T0 is made equal to one-half of the value of interval T1. The noted window of accessibility then is fully opened and the routine continues as represented at line 976, node 966, line 978, and node 980. To complete the logic, a negative determination with respect to block 970 is represented by the path line 982. The routine then continues as represented at line 984 to the inquiry represented at block 986. The ensuing region of the TICK routine module considers the condition wherein a lamp or horn warning signal has been produced and the vehicle, for example, may be suddenly braked to a stop, all this occurring before a latching condition occurs. Similarly, the speed of the vehicle may be so slow that it is appropriate to resume an OK state. To accommodate for this situation, the inquiry at block 986 determines whether the PROX timer value is less than 500 which, for the instant proximity interval represents about 1.8 seconds. The latter value is selected as representing either creeping speed or a stop condition. Where the determination at block 986 is in the negative, then as represented at line 988 and decision block 990, a determination is made as to whether the latched flag is active. Where the flag is not so active, then as represented by line 992 and block 994, the proximity timer and the latch timer are set to zero and the state is established as OK. As represented at line 996 and node 998, the routine then is ended.

Where the inquiry at block 986 is in the affirmative, then as represented at line 1000 and block 1002, the proximity timer is incremented and the routine progresses to end as represented at line 1004, node 1006, and line 1008. Similarly, in the event of an affirmative determination at decision block 990, as represented at line 1010, node 1006 and line 1008, the routine ends.

Figure 12:
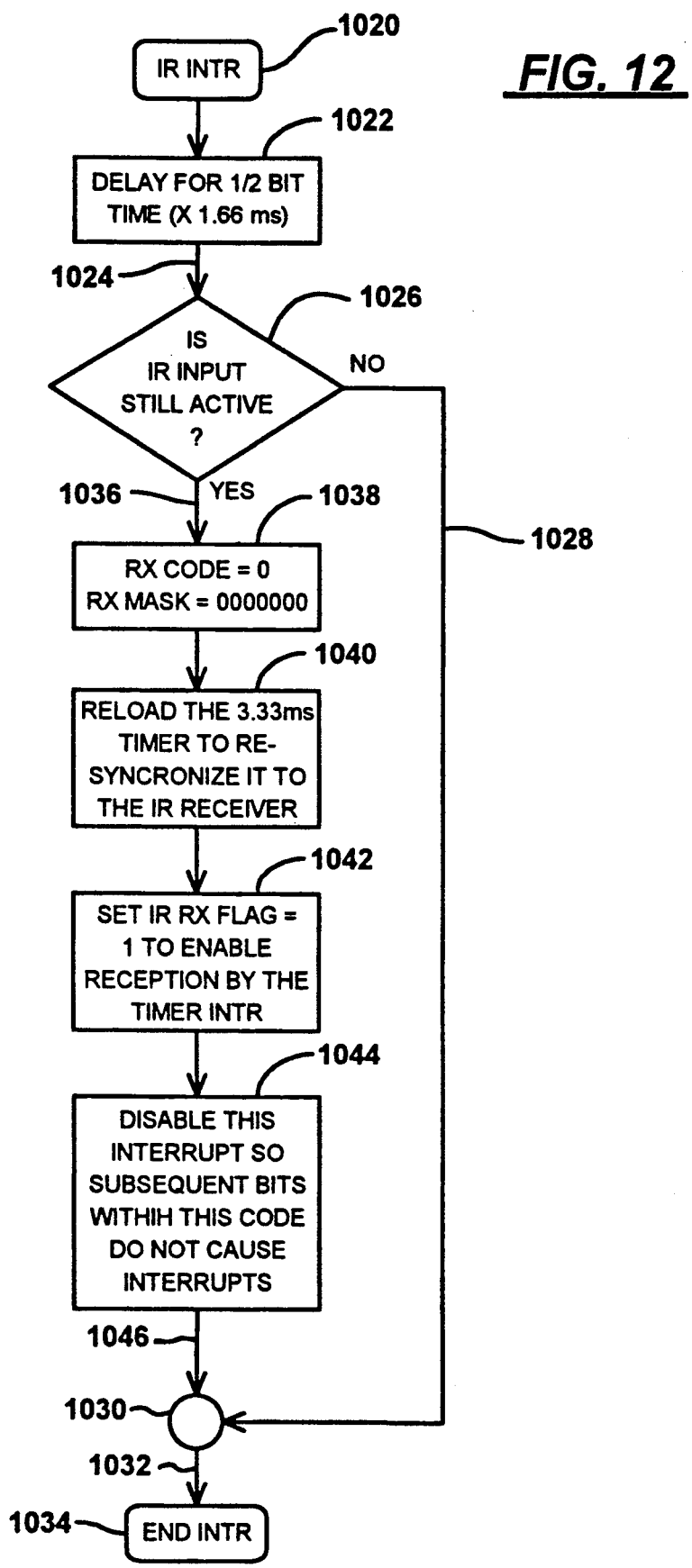
FIG. 12 is a flow diagram illustrating an IR INTR routine employed with the control system of the invention.

Referring to FIG. 12, a routine for carrying out the detection of the start bit of an IR code string generated from device 46 is presented and identified as "IR INTR". It may be observed from FIG. 5A that the output of the transmission circuitry 400 through diode D10 is always a logic high. This initial pulse is a start bit for the detection circuitry. The routine commences at node 1020 and progresses to the instructions at block 1022 providing for a delay following the receipt of the start bit of one-half of a bit interval or time which represents about 1.66 ms. Following this delay, as represented at line 1024 and decision block 1026, a determination is made as to whether the IR input is still active. Thus a determination is made as to whether the signal received is still true and this functions to eliminate response to very short noise pulses having a duration typically less than 1.66 ms. In the event of a negative determination of this evaluation as represented at block 1026, then noise is considered to be at hand and, as represented at line 1028, node 1030, line 1032, and node 1034, the routine is ended. However, should the IR input remain active, then a valid pulse is present and as represented at line 1036 and block 1038, the timer interrupts are prepared to receive the code by initially clearing the receive (RX) code counter to zero and setting a receive (RX) mask, the least significant bit of which is set at a binary 1. Then, as represented at block 1040, the 3.33 millisecond timer (timer 1) is reloaded such that it is synchronized to the IR receiver. Next, the IR receive (RX) flag is set to 1 to enable reception of the code string as carried out in conjunction with a timer interrupt (TIMER INTR) routine described in conjunction with FIG. 13A. The routine then continues to the instructions as represented at block 1044 wherein the instant interrupt is disabled such that subsequent bits within the code string do not cause interrupts. These subsequent bits will be data bits as opposed to start bits. The timer interrupts then will accumulate the data bits whereupon the routine will be re-enabled for a next code string. The routine then ends as represented by line 1046, node 1030, line 1032, and node 1034.

Figure 13A:
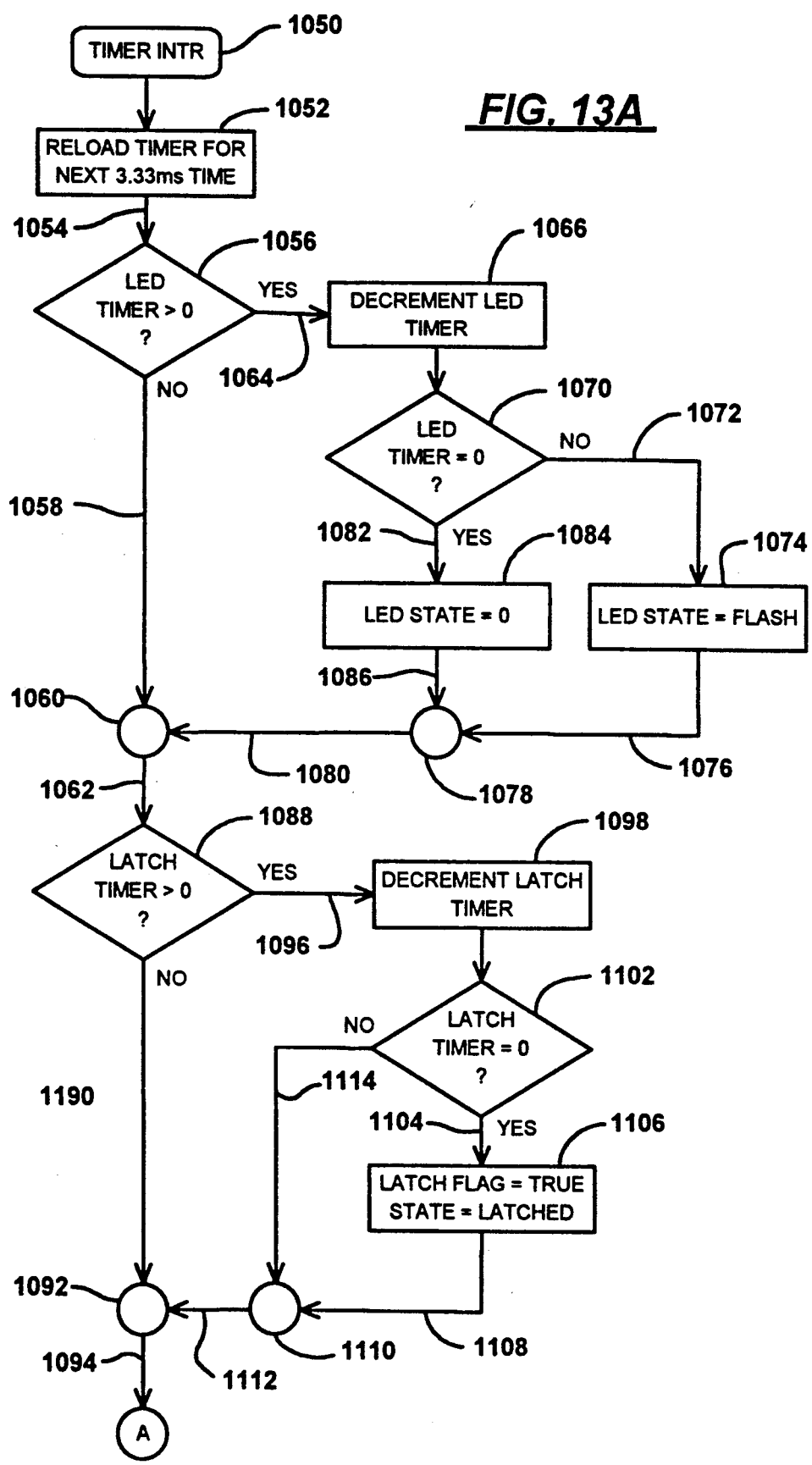

Referring to FIG. 13A, the timer interrupt routine utilizing the earlier-noted 3.3 ms interrupt interval and carrying out general purpose timing is described. Such timing will include the flashing activity of LED 44 as well as the IR receiver function timing. The routine is seen entered at node 1050 whereupon the timer is reloaded for a next 3.33 ms time interval as represented at block 1052. The LED 44 timer state is then entered into to determine whether, for example, the 15 minute interval for receiving a proximity based signal has occurred. Accordingly, as represented at line 1054 and decision block 1056, a determination is made as to whether the LED timer is greater than zero. In the event that it is not, the routine continues as represented at line 1058, node 1060, and line 1062. Where a determination is made that the LED timer value is greater than zero, then as represented at line 1064 and block 1066, the LED timer is decremented. The routine then proceeds as represented at line 1068 and decision block 1070 to determine whether the LED timer has reached a zero value. If such value is reached, then the noted predetermined or 15 minute interval during which a proximity signal is not received is at hand. Thus, in the event of a negative determination, as represented at line 1072 and block 1074 the LED state is made one of flashing indicating the normal condition and the routine continues as represented at line 1076, node 1078, and line 1080 to node 1060. On the other hand, if the determination at decision block 1070 is affirmative, then the predetermined interval has occurred and as represented at line 1082 and block 1084, the LED state is converted to an on condition. The routine then continues as represented at line 1086, node 1078, line 1080, and node 1060 as well as line 1062 to the inquiry represented at decision block 1088. The inquiry at block 1088 commences handling of, for example, a three second time-out for the latch timer, latching occurring at the time-out of this three seconds. The inquiry at block 1088 determines whether or not the latch timer value is greater than zero. In the event that it is not, then as represented at line 1090, node 1092, and line 1094, the routine proceeds to node A. Where the determination at block 1088 shows that the latch timer has a value greater than zero, then as represented at line 1096 and block 1098, the latch timer is decremented. The routine continues as represented at line 1100 and decision block 1102 to determine whether the latch timer has reached a zero value representing a three second time-out. In the event that it has, then as represented at line 1104 and block 1106, the latch flag is made true and the state of the control system is considered to be latched. The routine then continues as represented at line 1108, node 1110, and line 1112 to node 1092, line 1094, and node A. Where the determination at decision block 1102 is in the negative, then as represented at line 1114, the routine follows a path to node A.

Figure 13B:
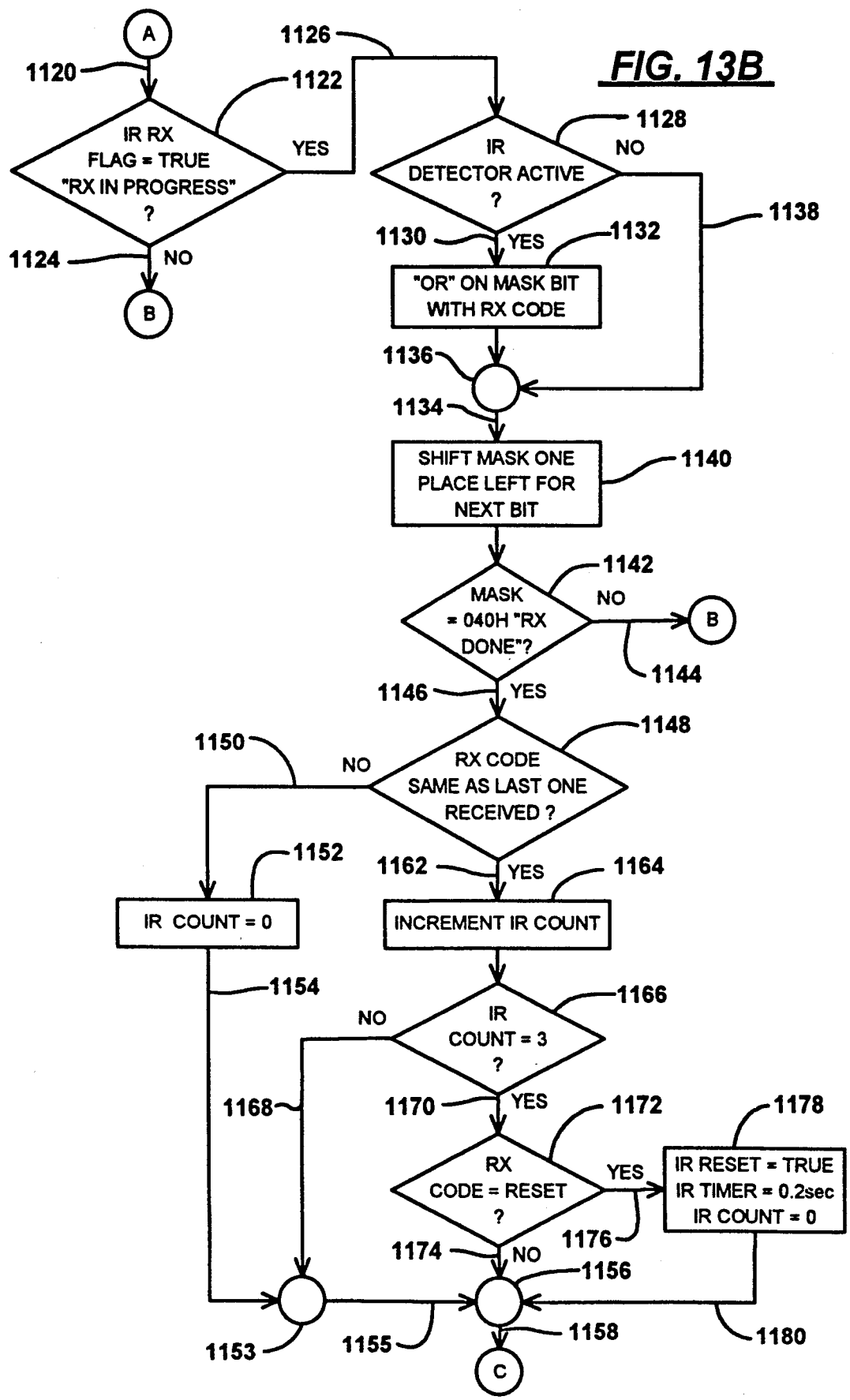

Referring to FIG. 13B, node A again recurs and the routine continues as represented at line 1120 and decision block 1122. At block 1122, a determination is made as to whether the IR receiver (RX) flag is true which indicates that a reception of a code suing is in progress. In the event of a negative determination, then as represented by line 1124 the routine progresses to node B as represented thereat. Where the IR RX flag is true, then as represented at line 1126 and block 1128 a determination is made as to whether the IR detector is active, i.e. whether an active bit is in detection. Where the determination is in the affirmative, then as represented by line 1130 and block 1132, the earlier-described mask is logically ORed with the received (RX) code bit. The routine then continues as represented by line 1134 containing node 1136. Where the determination at block 1128 is in the negative, then as represented by line 1138, the routine extends to node 1136 and a logic zero is assumed. The routine then continues to the instructions in block 1140 wherein the mask is shifted one place to the left for purposes of evaluating the next bit of the IR code string. Next, as represented at decision block 1142, a determination is made as to whether the mask has reached a value 040 hex. This indicates that the reception is completed. In the event of a negative determination, as represented at line 1144, the routine continues from node B. In the event of an affirmative determination at block 1142, then as represented at line 1146 and decision block 1 148, a determination is made as to whether the received (RX) code is the same as the last one received. With the program, the code is not considered valid unless it has been received three times in succession. Where the received code is not the same as the last code, then as represented at line 1150 and block 1152, the IR count is reset to zero and the routine continues as represented at line 1154 extending to node 1153 and line 1155 to node 1156, line 1158, and block 1160. The instructions at block 1160 provide for establishing the last received code as the currently received code. For the instant condition, the last code will remain. However, where the inquiry at block 1148 indicates that the currently received code is the same as the last received, then as represented at line 1162 and block 1164, the IR count is incremented, and as represented at decision block 1166, a determination is made as to whether the IR count is now 3. Where it is not, then as represented at line 1168, the routine progresses to node 1153, line 1155, node 1156, line 1158, and block 1160. On the other hand, where an affirmative determination is made at block 1166, then as represented at line 1170 and block 1172 a determination is made as to whether the received code is a reset code. Where the code received is not a reset code, then as represented at line 1174 the routine progresses to node 1156. Where an affirmative determination is made at block 1172, then as represented at line 1176 and block 1178, the IR reset flag is set true, the IR timer is set to 0.2 seconds which provides for a 0.2 second latching of the reset condition, and the IR count is returned to a zero value. The routine then returns as represented by line 1180 to node 1156.

Following the instructions represented at block 1160, the routine then progresses to the instructions at block 1182 wherein the IR receive flag is set to be false, the interrupt flag being cleared, inasmuch as a complete code string has been received. The routine then prepares for the reception of a next code. As represented at block 1184, the interrupt latch is cleared and, as represented at block 1186, the IR interrupt is re-enabled and the routine progresses to node B.

Referring to FIG. 13C, node B again is reproduced and leads via line 1190 to the inquiry at decision block 1192 wherein the IR timer is handled. This is the noted 0.2 second time-out. The inquiry at block 1192 looks to whether the IR timer is greater than zero. In the event that it is, then as represented at line 1194 and block 1196, the IR timer is decremented. The routine then continues as represented at line 1198 and block 1200 to determine whether the IR timer is now zero. In the event that it is, then as represented at line 1202 and block 1204, the IR reset is cleared and, as represented at line 1206, node 1208, line 1210, node 1212, line 1214, and node 1216, the routine is ended. Where the determination at block 1200 is in the negative, then as represented at line 1218 and node 1208, the routine path extends to node 1216 to end. Similarly, where the determination at block 1192 is in the negative, then as represented by line 1220 extending to node 1212, the routine ends.

Since certain changes may be made in the above-described method and apparatus without departing from the scope of the invention herein involved, it is intended that all matter contained in the description thereof or shown in the accompanying drawing shall be interpreted as illustrative and not in a limiting sense.

We claim:

1. Operation monitoring apparatus for an in-plant, operator-controlled vehicle having a motor drive and movably supported upon wheels of given diameter comprising:

wheel movement monitoring means for deriving a wheel rotation output in correspondence with the speed of said vehicle, said output being present as a sequence of intermittent pulse signals;

accumulator means having a resettable accumulator value increasing at a rate from an initial value to a final value and actuable to reset to said initial value;

comparison means responsive to said accumulator value, actuable to have an output transitioning from a standby state to an alarm state in the presence of a said accumulator value of level less than a predetermined value representing a select vehicle speed;

input means responsive to said wheel rotation output for deriving signals actuating said comparison means and said accumulator means in response to each said pulse signal; and cuing means having a perceptible output in response to said comparison means output when said alarm state.

2. Operation monitoring apparatus for an in-plant, operator controlled vehicle having an electrical source, a motor drive and moveably supported upon rotatable wheels of given diameter, comprising:

speed monitoring means coupled with said vehicle for deriving speed signals each corresponding with a predetermined extent of rotation of at least one of said wheels;

speed evaluation means responsive to said speed signal and having an output transitioning from a standby state to an alarm state in the presence of speed signals representing a speed of said vehicle exceeding a predetermined value;

speed cuing means having a perceptible output in response to said speed evaluation means output when in said alarm state;

diagnostic means responsive to said speed signals for providing a first output signal in the presence of the occurrence of said speed signals within a predetermined interval of time, for providing a second output signal in the absence of the occurrence of a said speed signal within said predetermined interval; and perceptible means responsive to said first and second output signals for providing a first visually perceptible output representing an acceptable operational condition in response to said first output signal and for providing a second visually perceptible output in response to said second output signal representing a non-acceptable operational condition.

3. The method for monitoring the speed of an in-plant, operator controlled vehicle having a motor drive and moveably supported upon wheels of given diameter, comprising the steps of:

providing a speed monitor having a monitor output present as intermittent pulse signals corresponding with the speed of said vehicle;

determining a first speed threshold value;

determining a second speed threshold as a selected valuation of said first speed threshold value;

accumulating comparison values at a predetermined rate from an initial value;

returning said accumulated comparison values to said initial value in response to each said monitor output pulse signal; and producing a first alarm visually perceptible to said operator when said accumulated comparison values reach an equivalency with a predetermined first speed threshold value.

4. The method of claim 3 including the step of producing a second alarm perceptible to said operator when said accumulated comparison values reach an equivalency with said second speed threshold value.

5. The method of claim 3 in which one said speed monitor output pulse signal is provided in correspondence with one revolution of one of said wheels of said vehicle.

6. The method of claim 5 in which said production of said first alarm is produced only following a predetermined sequence of more than one occurrence of said accumulated comparison values reaching a said equivalency.

7. The method of claim 3 including the steps of:

continuously monitoring said speed monitor for the presence of said monitor output;

providing a perceptible diagnostic output device actuable to have a first state representing a satisfactory operating condition and a second state representing an unsatisfactory condition;

actuating said output device to have said first state upon the occurrence of a said monitor output within a predetermined diagnostic interval; and actuating said output device to have said second state in the absence of a said monitor output within said diagnostic interval.

8. Operation monitoring apparatus for an in-plant, operator controlled vehicle having a motor drive and movably supported upon wheels of given diameter, comprising:

a speed monitor having a monitor output present as intermittent monitor pulse signals having a pulse rate corresponding with the speed of said vehicle, said monitor output exhibiting a said pulse rate increasing in correspondence with increasing speeds of said vehicle;

first cuing means actuable to provide a first perceptible output;

timing signal means for providing a sequence of timing signals of predetermined interval;

timer-counter means responsive to said timing signals and to successive said monitor pulse signals to count from an initial reset value to derive a vehicle speed value in correspondence with a count of said timing signals and resettable to said initial reset value in response to each one of said monitor pulse signals;

input means for providing a first speed limit value, T1; and control means responsive to said vehicle speed value and said first speed limit value for transitioning from a standby state to a first monitor state and for actuating said first cuing means when said vehicle speed value is less than said first speed limit value, T1.

9. The apparatus of claim 8 including:

second cuing means actuable to provide a second perceptible output; and in which said control means is responsive to a second speed limit value, T2, greater than said first speed limit value T1, and to said vehicle speed value for deriving a second monitor state and for actuating said second cuing means when said vehicle speed value is greater than said first speed limit value, T1, and less than said speed limit value, T2.

10. Operation monitoring apparatus for an in-plant, operator-controlled vehicle having a motor drive and movably supported upon wheels of given diameter, comprising:
wheel movement monitoring means for deriving a wheel rotation signal of correspondence with the speed of said vehicle;
accumulator means having an accumulator value increasing at a rate from an initial value to a final value and actuable to assume said initial value;
comparison means responsive to said accumulator value, actuable to having a first output transitioning from a standby state to a first alarm state in the presence of a said accumulator value less than a first predetermined value representing a first select vehicle speed, and to have a second output transitioning from said standby state to a second alarm state in the presence of a said accumulator value less than a second predetermined value less than said first value and representing a second select vehicle speed greater than said select vehicle speed;
input means responsive to said wheel rotation signal for deriving signals actuating said comparison means and said accumulator means; and
cuing means having visually perceptible output responsive to said first alarm state and an aurally audible perceptible output responsive to said second alarm state.

11. The apparatus of claim 10 in which said wheel movement monitoring means comprises;
a flag coupled to a said wheel of said vehicle at a select position and rotatable therewith; and
a detector mounted upon said vehicle and deriving said wheel rotation signal when said flag is moved into adjacency therewith.

12. The apparatus of claim 11 in which said comparison means predetermined value representing a select vehicle speed is predetermined with respect to said flag rotation.

13. The apparatus of claim 10 including diagnostic means comprising:
diagnostic cuing means responsive to said wheel rotation signal for providing an output signal in a first mode in the presence of a recurrence of said wheel rotation signal, for providing an output signal in a second mode in the absence of the occurrence of said wheel rotation signal within a predetermined interval of time; and
perceptible means responsive to said output signals for providing a perceptible representation thereof.

14. The apparatus of claim 13 in which said perceptible means is provided as an externally viewable light mounted upon said vehicle.

15. The apparatus of claim 10 including:
manually actuable reset code transmitter for broadcasting coded reset signals from a location remote from said vehicle; and
reception means mounted with said vehicle and responsive to said broadcast coded reset signals to alter said comparison means from said alarm state to said standby state.

16. Operation monitoring apparatus for an in-plant operator controlled vehicle having a motor drive and movably supported upon wheels of given diameter, comprising:
a speed monitor having an intermittent monitor output present as pulse signals corresponding with the speed of said vehicle, said monitor output exhibiting an interval of time between successive said pulse signals of lessening duration in correspondence with increasing speeds of said vehicle;
first cuing means actuable to provide a first perceptible output;
timing signal means for providing a sequence of timing signals of predetermined interval;
timer-counter means responsive to said timing signals and to successive said monitor output pulse signals to drive a vehicle speed value;
input means for providing a first speed limit value, T1; and
control means responsive to said vehicle speed value and first speed limit value for transitioning from a standby state to a first monitor state and for actuating said first cuing means when said vehicle speed value is less than said first speed limit value, T1, said control means being responsive to a selected noise value, T0, and to said vehicle speed value for deriving an ignore state when said noise value is greater than said vehicle speed value, said noise value being selected to correspond with phenomena not associated with conventionally encountered motion of said vehicle.

17. Operation monitoring apparatus for an in-plant, operator controlled vehicle having a motor drive and movably supported upon wheels of given diameter, comprising:
a speed monitor having an intermittent monitor output present as pulse signals corresponding with the speed of said vehicle, said monitor output exhibiting an interval of time between successive said pulse signals of lessening duration in correspondence with increasing speeds of said vehicle;
first cuing means actuable to provide a first perceptible output;
second cuing means actuable to provide a second perceptible output;
timing signal means for providing a sequence of timing signals of predetermined interval
timer-counter means responsive to said timing signals and to successive said monitor output pulse signals to drive a vehicle speed value;
input means for providing a first speed limit value, T1; and
control means responsive to said vehicle speed value and said first speed limit value for transitioning from a standby state to a first monitor state and for actuating said first cuing means when said vehicle speed value is less than said first speed limit value, T1, said control means being responsive to a second speed limit value, T2, greater than said first speed limit value T1, and to said vehicle speed value for deriving a second monitor state and for actuating said second cuing means when said vehicle speed is greater than said first speed limit value, T1, and less than said speed limit value, T2, said control means being responsive to a selected noise value, T0, and to said vehicle speed value for deriving an ignore state when said noise value is greater than said vehicle speed value, said noise value being selected to correspond with phenomena not associated with conventionally encountered motion of said vehicle, said control means being responsive to derive said first monitor state when said vehicle speed value is greater than said noise value, T0, and is less than said first speed limit value, T1, said control means effecting said actuation of said first cuing means in response to a predetermined number of successive occurrences of said first monitor state.

18. The apparatus of claim 17 including:
second cuing means actuable to provide a second perceptible output; and
said control means is responsive to a second speed limit value, T2, greater than said first speed limit, T1 and to said vehicle speed value for deriving a second monitor state and for actuating said second cuing means when said vehicle speed value is greater than said first speed limit value, T1, and less than said speed limit value, T2.

19. The apparatus of claim 18 in which said control means effects said actuation of said second means in response to a predetermined number of occurrences greater than once of said second monitor state.

20. The apparatus of claim 18 in which said control means is responsive to said first speed limit value, T1, to derive said second speed limit value is correspondence therewith.

21. The apparatus of claim 19 in which said control means derives said noise value, T0, as an initial value substantially equal to said first speed limit value, T1 prior to the first occurrence of said second monitor state.

22. The apparatus of claim 20 in which said control means selectively diminishes said initial value of said noise value, T0 in correspondence with each said successive occurrence of said second monitor state.

23. The apparatus of claim 20 in which said control means is responsive to said first occurrence of said second monitor state to negate said response to all said occurrences of said first monitor state.

24. Operation monitoring apparatus for an in-plant, operator controlled vehicle having a motor drive and movably supported upon wheels of given diameter, comprising:
a speed monitor having an intermittent monitor output present as pulse signals corresponding with the speed of said vehicle, said monitor output exhibiting an interval of time between successive said pulse signals of lessening duration in correspondence with increasing speeds of said vehicle;
first cuing means actuable to provide a first perceptible output;
timing signal means for providing a sequence of timing signals of predetermined interval;
timer-counter means responsive to said timing signals and to successive said monitor output pulse signals to derive a vehicle speed value;
input means for providing a first speed limit value, T1;
a manually actuable reset code transmitter for broadcasting coded reset signals from a location remote from said vehicle;
code reception means mounted with said vehicle and responsive to said broadcast coded reset signals to provide a sequence of reset input signals; and
control means responsive to said vehicle speed value and said first speed limit value for transitioning from a standby state to a first monitor state and for actuating said first cuing means when said vehicle speed value is less than said first speed limit value, T1, said control means being responsive to said reset input signals to transition from said first monitor state to said standby state.

25. Operation monitoring apparatus for an in-plant, operator-controlled vehicle having a motor drive and movably supported upon wheels of given diameter, comprising:
wheel movement monitoring means for deriving a wheel rotation output in correspondence with the speed of said vehicle, said output being present as a sequence of intermittent pulse signals;
accumulator means having an accumulator value increasing at a rate from an initial value to a final value and actuable to assume said initial value;
comparison means responsive to said accumulator value, actuable to have an output transitioning from a standby state to an alarm state in the presence of a said accumulator value of level less than a predetermined value representing a select vehicle speed;
input means responsive to said wheel rotation output for deriving signals actuating said comparison means and said accumulator means in response to each said pulse signal;
cuing means having a perceptible output in response to said comparison means output when in said alarm state; and
override means responsive to said wheel rotation output and to said comparison means output for enabling said cuing means to have said perceptible output only following the sequential occurrence of a predetermined number of said wheel rotation output pulse signals in the presence of said comparison means alarm state.

* * * * *